(12) United States Patent
Usami et al.

(10) Patent No.: US 10,162,110 B2
(45) Date of Patent: Dec. 25, 2018

(54) SEMICONDUCTOR DEVICE AND METHOD FOR MANUFACTURING THE SAME

(71) Applicants: Renesas Electronics Corporation, Tokyo (JP); Photonics Electronics Technology Research Association, Tokyo (JP)

(72) Inventors: Tatsuya Usami, Hitachinaka (JP); Keiji Sakamoto, Hitachinaka (JP); Yoshiaki Yamamoto, Hitachinaka (JP); Shinichi Watanuki, Hitachinaka (JP); Masaru Wakabayashi, Hitachinaka (JP); Tohru Mogami, Tokyo (JP); Tsuyoshi Horikawa, Tokyo (JP); Keizo Kinoshita, Tokyo (JP)

(73) Assignees: RENESAS ELECTRONICS CORPORATION, Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 34 days.

(21) Appl. No.: 15/243,718

(22) Filed: Aug. 22, 2016

(65) Prior Publication Data
US 2017/0068047 A1    Mar. 9, 2017

(30) Foreign Application Priority Data
Sep. 4, 2015    (JP) ................................. 2015-174294

(51) Int. Cl.
| | | |
|---|---|---|
| G02B 6/12 | (2006.01) | |
| G02B 6/132 | (2006.01) | |
| G02B 6/136 | (2006.01) | |

(52) U.S. Cl.
CPC ......... *G02B 6/12002* (2013.01); *G02B 6/132* (2013.01); *G02B 6/136* (2013.01)

(58) Field of Classification Search
CPC .... G02B 6/12002; G02B 6/132; G02B 6/136; G02B 2006/12166; H01S 5/0206; H01S 5/0218; H01S 5/026; H01S 5/0265; H01L 21/74; H01L 21/30621; H01L 21/30612; H01L 21/30635; H01L 21/302;
(Continued)

(56) References Cited

U.S. PATENT DOCUMENTS

| | | | | |
|---|---|---|---|---|
| 4,978,188 A | * | 12/1990 | Kawachi | ................ G02B 6/105 385/130 |
| 5,783,844 A | * | 7/1998 | Kobayashi | ............. G02B 6/125 257/103 |

(Continued)

FOREIGN PATENT DOCUMENTS

JP    2012-027198 A    2/2012

*Primary Examiner* — Thomas A Hollweg
*Assistant Examiner* — Guy Anderson
(74) *Attorney, Agent, or Firm* — McGinn IP Law Group, PLLC

(57) ABSTRACT

A semiconductor device is provided with an insulating layer formed on a base substrate, an optical waveguide composed of a semiconductor layer formed on the insulating layer, and an insulating film formed along an upper surface of the insulating layer and a front surface of the optical waveguide. A peripheral edge portion of a lower surface of the optical waveguide is separated from the insulating layer, and the insulating film is buried between the peripheral edge portion and the insulating layer.

20 Claims, 23 Drawing Sheets

(58) Field of Classification Search
CPC ........... H01L 21/3086; H01L 21/30604; H01L 21/76877; H01L 31/0232; H01L 31/02327; H01L 31/58
USPC .................................................. 385/129–132
See application file for complete search history.

(56) References Cited

U.S. PATENT DOCUMENTS

| | | | | |
|---|---|---|---|---|
| 6,403,986 | B1* | 6/2002 | Kobayashi | G02B 6/125 257/88 |
| 6,847,750 | B1* | 1/2005 | Baumann | G02F 1/011 385/129 |
| 6,983,086 | B2* | 1/2006 | Fardi | G02F 1/0147 257/98 |
| 7,899,286 | B2* | 3/2011 | Yoshida | G02B 6/305 385/39 |
| 8,030,668 | B2* | 10/2011 | Hisamoto | G02B 6/13 257/86 |
| 9,261,649 | B2* | 2/2016 | Kitamura | G02B 6/136 |
| 9,568,671 | B2* | 2/2017 | Vivien | B82Y 10/00 |
| 2001/0037994 | A1* | 11/2001 | Ezaki | C23C 14/48 216/62 |
| 2002/0094598 | A1* | 7/2002 | Kobayashi | G02B 6/125 438/57 |
| 2003/0146485 | A1* | 8/2003 | Ezaki | C23C 14/48 257/499 |
| 2008/0197362 | A1* | 8/2008 | Hisamoto | G02B 6/13 257/86 |
| 2009/0087144 | A1* | 4/2009 | Yoshida | G02B 6/107 385/43 |
| 2015/0043867 | A1* | 2/2015 | Kono | G02F 1/2257 385/3 |
| 2015/0260915 | A1* | 9/2015 | Kitamura | G02B 6/136 385/131 |
| 2015/0277044 | A1* | 10/2015 | Hatori | G02B 6/1228 385/43 |

* cited by examiner

SEMICONDUCTOR DEVICE AND METHOD FOR MANUFACTURING THE SAME

CROSS-REFERENCE TO RELATED APPLICATION

The present application claims priority from Japanese Patent Application No. 2015-174294 filed on Sep. 4, 2015, the content of which is hereby incorporated by reference into this application.

TECHNICAL FIELD OF THE INVENTION

The present invention relates to a semiconductor device and a method for manufacturing the same and is desirably applicable, for example, to a semiconductor device provided with optical devices inside a semiconductor chip and a method for manufacturing such a device.

BACKGROUND OF THE INVENTION

In recent years, a silicon photonics technology has been developed. In this silicon photonics technology, an optical signal transmission line made of silicon as a material is formed on a semiconductor substrate, and by integrating various optical devices and electronic devices formed by the optical signal transmission line, a semiconductor device serving as an optical communication module is realized. Among the semiconductor devices of this type, there is an optical signal transmission line provided with an optical waveguide composed of a semiconductor layer formed on a substrate with an insulating layer interposed therebetween and an insulating film formed on the insulating layer so as cover the optical waveguide. In this case, the optical waveguide functions as a core layer, and the insulating layer and the insulating film function as cladding layers.

Japanese Patent Application Laid-Open Publication No. 2012-27198 (Patent Document 1) has disclosed a technique in which in an optical semiconductor device, a semiconductor layer made of an intrinsic semiconductor that is formed on a substrate, and an optical waveguide corresponding to a part of the semiconductor layer are provided.

SUMMARY OF THE INVENTION

It is very difficult to completely remove photosensitive resist which is used upon forming an optical waveguide by patterning a semiconductor layer through use of the photolithography technique and the etching technique after the patterning process. For this reason, prior to carrying out the next process after the formation of the optical waveguide, an upper surface of the insulating layer needs to be cleaned by using a cleaning liquid; however, upon cleaning the upper surface of the insulating layer, a gap is sometimes formed between a lower surface of the optical waveguide and the insulating layer. Otherwise, upon carrying out the etching process, a gap is sometimes formed between the lower surface of the optical waveguide and the insulating layer.

In a case in which such a gap is formed, upon forming the insulating film so as to cover the optical waveguide thereafter, the gap between the lower surface of the optical waveguide and the insulating layer is not buried by the insulating film, causing a possibility that a space might be formed between the lower surface of the optical waveguide and the insulating layer. This space causes light propagating through the optical waveguide to be irregularly reflected, and as a result, the optical characteristic of the optical waveguide deteriorates. Consequently, it is not possible to improve performances of the semiconductor device.

Other objects and novel characteristics of the present invention will be apparent from the description of the present specification and the accompanying drawings.

In accordance with one embodiment, a semiconductor device is provided with an insulating layer formed on a base substrate, an optical waveguide composed of a semiconductor layer formed on the insulating layer, and an insulating film formed along an upper surface of the insulating layer and a front surface of the optical waveguide. A peripheral edge portion of a lower surface of the optical waveguide is separated from the insulating layer, and the insulating film is buried between the peripheral edge portion and the insulating layer.

Moreover, in accordance with another embodiment, in a method for manufacturing a semiconductor device, a semiconductor substrate having an insulating layer formed on a base substrate and a semiconductor layer formed on the insulating layer is prepared, and after patterning the semiconductor layer to form an optical waveguide composed of the semiconductor layer, an insulating film is formed along the upper surface of the insulating layer and the front surface of the optical waveguide. Upon forming the optical waveguide, a gap is formed between the peripheral edge portion of the lower surface of the optical waveguide and the insulating layer, and upon forming the insulating film, the gap is buried by the insulating film.

In accordance with an embodiment, the performances of the semiconductor device can be improved.

BRIEF DESCRIPTIONS OF THE DRAWINGS

DESCRIPTIONS OF THE PREFERRED EMBODIMENTS

Figure 1:
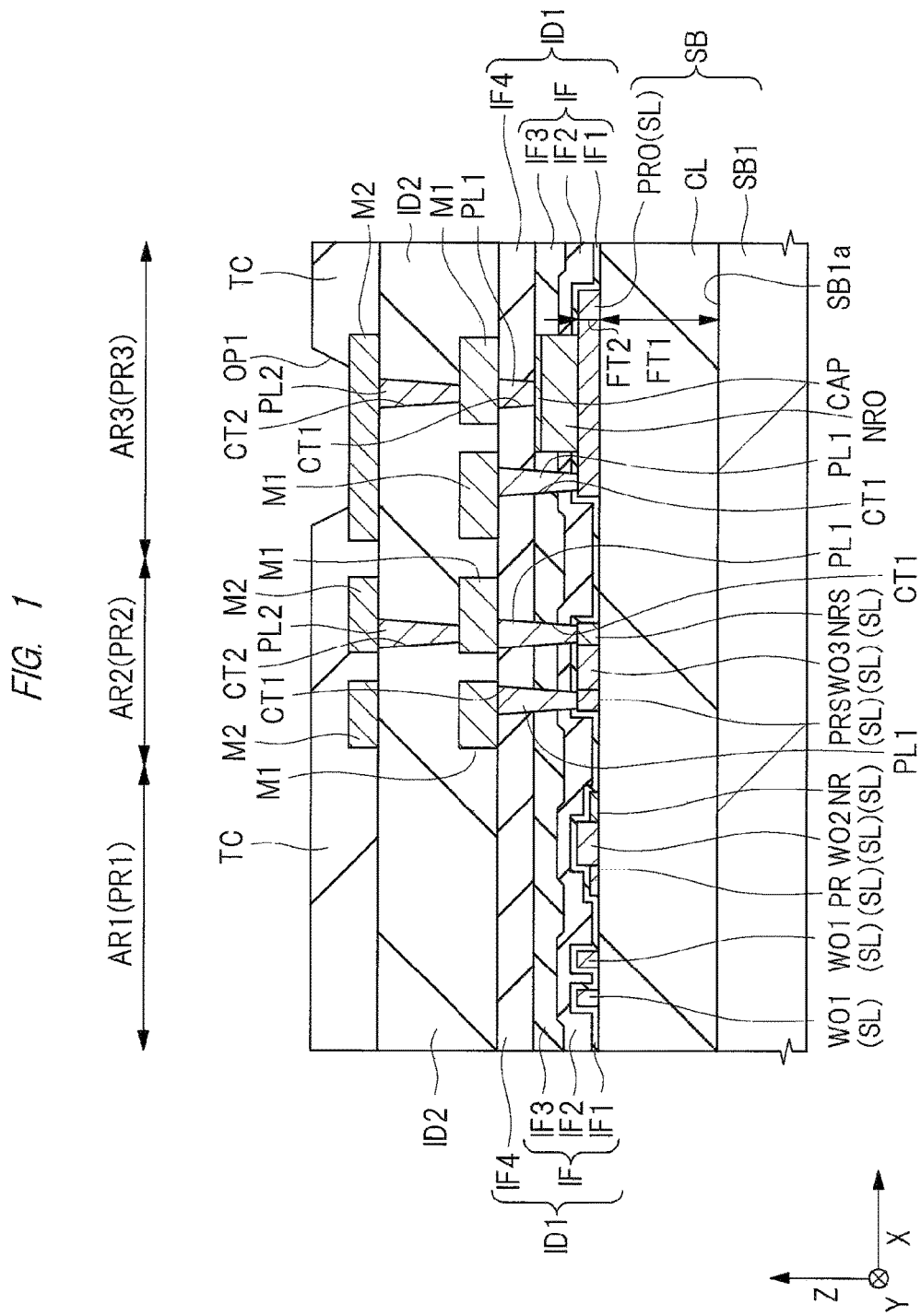
FIG. 1 is a cross-sectional view showing a main part of a semiconductor device in accordance with a first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, numerical values, amount, range, and the like), the number of the elements is not limited to a specific number unless otherwise stated or except the case where the number is apparently limited to a specific number in principle. The number larger or smaller than the specific number is also applicable.

Further, in the embodiments described below, it goes without saying that the components (including element steps and the like) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiment, and the repetitive description thereof will be omitted. In addition, the description of the same or similar portions is not repeated in principle unless particularly required in the following embodiments.

Also, in some drawings used in the embodiments, hatching may be omitted even in a cross-sectional view so as to make the drawings easy to see. Also, hatching may be used even in a plan view so as to make the drawings easy to see.

(First Embodiment)

First, a semiconductor device in accordance with a first embodiment will be described with reference to FIG. 1. FIG. 1 is a cross-sectional view showing a main part of the semiconductor device in accordance with the first embodiment.

As shown in FIG. 1, in the first embodiment, a semiconductor device which is provided with an optical signal transmission line section PR1, an optical modulation section PR2, and a photoelectric conversion section PR3 formed on a base substrate SB1 made of, for example, single crystal silicon is exemplified. Moreover, in the first embodiment, the semiconductor device provided with multilayer wiring having a two-layer structure is exemplified; however, the present invention is not intended to be limited by this structure.

<Optical Signal Transmission Line Section>

As shown in FIG. 1, the semiconductor device of the first embodiment is provided with the base substrate SB1, an insulating layer CL formed on the base substrate SB1, and a semiconductor layer SL formed on the insulating layer CL. A semiconductor substrate SB serving as an SOI (Silicon on Insulator) substrate is formed by the base substrate SB1, the insulating layer CL, and the semiconductor layer SL. The base substrate SB1 is composed of a p-type silicon (Si) single-crystal substrate having, for example, a plane direction of (100) and a resistivity of about 5 to 50 Ωcm. The insulating layer CL is also referred to as a BOX (Buried Oxide) layer and is made of, for example, a silicon oxide ($SiO_2$) film. The semiconductor layer SL is also referred to as an SOI (Silicon on Insulator) layer and is formed by thinning the p-type silicon single-crystal substrate having, for example, a plane direction of (100) and a resistivity of about 5 to 50 Ωcm. A film thickness FT1 of the insulating layer CL may be set to, for example, about 2 to 3 μm, and a film thickness FT2 of the semiconductor layer SL may be set to, for example, about 180 to 250 nm.

The base substrate SB1 is provided with regions AR1, AR2, and AR3 on a main surface SB1$a$ side of the base substrate SB1. In the region AR1, the optical signal transmission line section PR1 is formed. Note that, in the region AR2, the optical modulation section PR2 is formed, and in the region AR3, the photoelectric conversion section PR3 is formed.

As shown in FIG. 1, in the region AR1, various optical signal transmission lines, that is, optical waveguides WO1 and WO2 serving as optical signal lines, are formed. Each of the optical waveguides WO1 and WO2 functions as a core layer.

As shown in FIG. 1, two directions that intersect with each other, or more preferably, are orthogonal to each other on the main surface SB1a of the base substrate SB1 are defined as an X-axis direction and a Y-axis direction, and a direction perpendicular to the main surface SB1a of the base substrate SB1, that is, a top and bottom direction, is defined as a Z direction. Moreover, in the present specification, the sentence, "when seen in a plan view," means when seen from a direction perpendicular to the main surface SB1a of the base substrate SB1.

The optical waveguide WO1 is composed of the semiconductor layer SL. The detailed structure on the periphery of the optical waveguide WO1 will be described later. Note that, although not shown in the drawing, an optical phase shifter for changing the phase of light may be formed as one example of the optical waveguide WO1. The optical phase shifter is also composed of the semiconductor layer SL in the same manner as in the case of another optical waveguide WO1.

The optical waveguide WO2 is also composed of the semiconductor layer SL in the same manner as in the optical waveguide WO1. The semiconductor layer SL included in the optical waveguide WO2 is processed into a rib shape. A thick portion of the semiconductor layer SL processed into the rib shape, that is, a rib portion, forms the optical waveguide WO2. The optical waveguide WO2 extends in the Y-axis direction (direction perpendicular to the paper surface on which FIG. 1 is drawn). Accordingly, an optical signal to be introduced into the optical waveguide WO2 travels in the Y-axis direction.

A height of the optical waveguide WO2 is equal to, for example, the film thickness FT2 of the semiconductor layer SL described above, and a width of the optical waveguide WO1 in the X-axis direction is, for example, about 500 nm. Moreover, a thin portion of the semiconductor layer SL is, for example, about 50 nm. An impurity is introduced into the optical waveguide WO2, and its impurity concentration is, for example, in a range of $10^{15}$ to $10^{19}$ cm$^{-3}$, and its typical value is set to, for example, about $10^{15}$ cm$^{-3}$.

A p-type impurity is introduced into the semiconductor layer SL on one side (left side in FIG. 1) of the optical waveguide WO2 in the X-axis direction, so that a p-type semiconductor PR is formed. This p-type semiconductor PR is formed in parallel with the optical waveguide WO2. Moreover, an n-type impurity is introduced into the semiconductor layer SL on the other side (right side in FIG. 1) of the optical waveguide WO2 in the X-axis direction, so that an n-type semiconductor NR is formed. This n-type semiconductor NR is in parallel with the optical waveguide WO2. That is, the semiconductor layer SL between the p-type semiconductor PR and the n-type semiconductor NR serves as the optical waveguide WO2.

When a forward bias voltage is applied to this structure, carriers are implanted into the optical waveguide WO2. When the carriers are implanted into the optical waveguide WO2, carrier plasma effect, that is, a phenomenon resulted from increase of electron-hole pairs (plasma) by optically generated carriers, occurs in the optical waveguide WO2, so that a refractive index of light in the optical waveguide WO2 changes. When the refractive index of light in the optical waveguide WO2 changes, the wavelength of light traveling through the optical waveguide WO2 changes, so that optical phase can be changed in the course of traveling through the optical waveguide WO2.

The optical waveguide WO2 is covered with interlayer insulating films ID1 and ID2 and a protective film TC. The interlayer insulating films ID1 and ID2 are made of, for example, silicon oxide. The protective film TC is made of, for example, silicon oxynitride (SiON). In the optical signal transmission line section PR1, none of a wire M1 and a wire M2 to be described later are formed.

<Optical Modulation Section>

As shown in FIG. 1, in the region AR2, the optical modulation section PR2 is formed. The optical modulation section PR2 changes an electric signal into an optical signal. The optical modulation section PR2 is composed of the semiconductor layer SL. In this case, an optical modulation section having a pin structure is described by way of example; however, the present invention is not intended to be limited by this.

The optical modulation section PR2 is provided with an optical waveguide WO3, a p-type semiconductor PRS, and an n-type semiconductor NRS and has the pin structure. The optical waveguide WO3, the p-type semiconductor PRS, and the n-type semiconductor NRS are composed of the semiconductor layer SL in the same manner as in the optical waveguides WO1 and WO2.

The optical waveguide WO3 extends in the Y-axis direction (the direction perpendicular to the paper surface on which FIG. 1 is drawn). Accordingly, an optical signal introduced into the optical waveguide WO3 travels in the Y-axis direction. The optical waveguide WO3 into which no impurity is introduced is composed of an intrinsic semiconductor, that is, a semiconductor of an i (intrinsic) type.

A p-type impurity is introduced into the semiconductor layer SL on one side (left side in FIG. 1) of the optical waveguide WO3 in the X-axis direction, so that a p-type semiconductor PRS is formed. The p-type semiconductor PRS is in parallel with the optical waveguide WO3. Moreover, an n-type impurity is introduced into the semiconductor layer SL on the other side (right side in FIG. 1) of the optical waveguide WO3 in the X-axis direction, so that an n-type semiconductor NRS is formed. The n-type semiconductor NRS is in parallel with the optical waveguide WO3. That is, the semiconductor layer SL between the p-type semiconductor PRS and the n-type semiconductor NRS serves as the optical waveguide WO3 composed of the intrinsic semiconductor so as to form a pin structure. Each of plugs PL1 is connected to each of the p-type semiconductor PRS and the n-type semiconductor NRS as an electrode.

A voltage applied to the electrode changes the carrier density in the optical waveguide WO3 composed of the intrinsic semiconductor, so that a refractive index in the corresponding region changes. Thus, an effective refractive index relative to light propagating through the optical modulation section PR2 changes, so that the optical phase output from the optical modulation section PR2 can be changed.

The optical modulation section PR2 is covered with the interlayer insulating film ID1, and in the interlayer insulating film ID1, connection holes CT1 serving as contact holes penetrating the interlayer insulating film ID1 to reach the p-type semiconductor PRS and the n-type semiconductor NRS, respectively, are formed. Inside each of the connection holes CT1, the plugs PL1 made of tungsten (W) are buried, so that the p-type semiconductor PRS and one of wires M1 of the first layer are electrically connected to each other through one of the plugs PL1 and the n-type semiconductor NRS and another one of the wires M1 are electrically connected to each other through another one of the plugs PL1. The wire M1 is made of, for example, an aluminum-copper alloy (Al—Cu alloy).

The wires M1 are covered with the interlayer insulating film ID2, and in the interlayer insulating film ID2, a connection hole CT2 serving as a via hole penetrating the interlayer insulating film ID2 to reach one of the wires M1 is formed. Inside the connection hole CT2, a plug PL2 made of tungsten (W) is buried, so that one of the wires M1 and one of wires M2 of the second layer are electrically connected to each other through the plug PL2. The wires M2 are covered with the protective film TC. The wires M2 are made of, for example, an aluminum-copper alloy.

<Photoelectric Conversion Section>

As shown in FIG. 1 the photoelectric conversion section PR3 is formed in the region AR3. The photoelectric conversion section PR3 converts an optical signal into an electric signal. The photoelectric conversion section PR3 is composed of the semiconductor layer SL. In this case, a photoelectric conversion section having a pn-junction structure in which the p-type semiconductor and the n-type semiconductor are joined to each other is described by way of example; however, the present invention is not intended to be limited by this.

The photoelectric conversion section PR3 is provided with a p-type semiconductor PRO and an n-type semiconductor NRO and has the pn-junction structure. The p-type semiconductor PRO is composed of the semiconductor layer SL into which a p-type impurity is introduced. The n-type semiconductor NRO is formed on the p-type semiconductor PRO. The n-type semiconductor NRO is made of germanium (Ge) into which an n-type impurity is introduced. Moreover, on the n-type semiconductor NRO, a cap layer CAP is formed. The cap layer CAP is made of silicon so as to prevent germanium contained in the n-type semiconductor NRO from having damage such as a surface roughness or a reduction in film thickness.

To each of the cap layers CAP on the n-type semiconductor NRO and the p-type semiconductor PRO, the plug PL1 is connected as an electrode. A direct current flowing through the pn-junction section contained in the photoelectric conversion section PR3 due to photovoltaic effect can be externally taken out by the plug PL1.

The photoelectric conversion section PR3 is covered with the interlayer insulating film ID1, and in the interlayer insulating film ID1, the connection holes CT1 serving as the contact holes that penetrate interlayer insulating film ID1 to reach the cap layer CAP and the p-type semiconductor PRO, respectively, are formed. Inside the connection holes CT1, the plugs PL1 made of tungsten are buried, so that the n-type semiconductor NRO and one of the wires M1 are electrically connected to each other through one of the plugs PL1 and the p-type semiconductor PRO and another one of the wires M1 are electrically connected to each other through another one of the plugs PL1.

The wire M1 is covered with the interlayer insulating film ID2, and in the interlayer insulating film ID2, a connection hole CT2 serving as a via hole penetrating the interlayer insulating film ID2 to reach one of the wires M1 is formed. Inside the connection hole CT2, the plug PL2 made of tungsten is buried, so that one of the wires M1 and the wire M2 are electrically connected to each other through the plug PL2.

The wire M2 is covered with the protective film TC, and in the protective film TC, an opening OP1 that penetrates the protective film TC to reach the wire M2 is formed. On the bottom of the opening OP1, the wire M2 is exposed.

<Structure on Periphery of Optical Waveguide>

Figure 2:
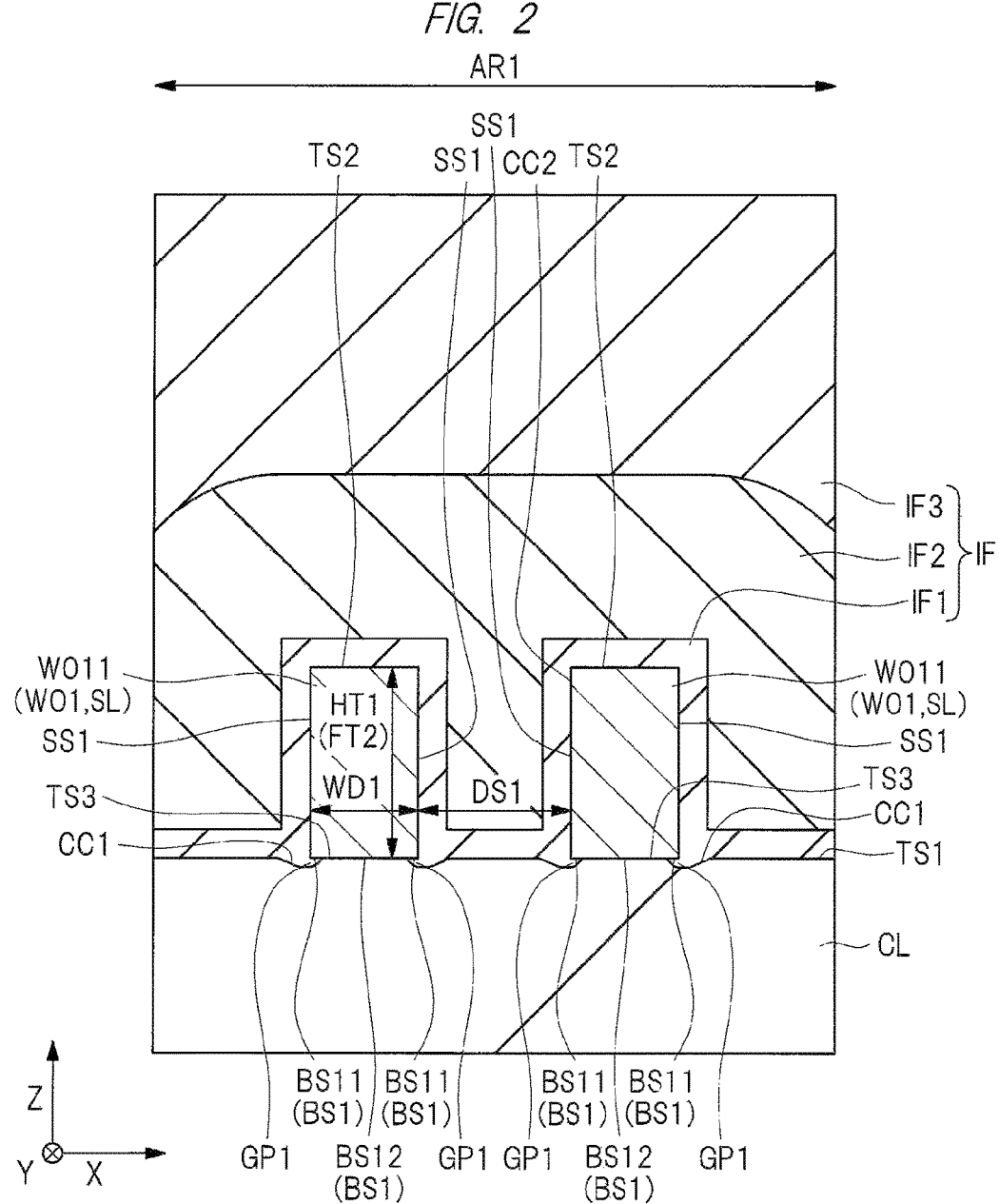
FIG. 2 is a cross-sectional view showing a main part of the semiconductor device in accordance with the first embodiment.

Next, the structure on the periphery of the optical waveguide WO1 will be described with reference to FIG. 2. FIG. 2 is a cross-sectional view showing a main part of the semiconductor device in accordance with the first embodiment. FIG. 2 shows the structure on the periphery of the optical waveguide WO1 in an enlarged manner.

As shown in FIG. 2, in the region AR1, two optical waveguides WO11, each serving as the optical waveguide WO1, are formed. The two optical waveguides WO11 are formed on the insulating layer CL in the region AR1 on the main surface SB1a side (see FIG. 1) of the base substrate SB1 (see FIG. 1). The two optical waveguides WO11 are, for example, disposed to be spaced apart from each other in the X-axis direction, when seen in a plan view.

A height HT1 of the optical waveguide WO11 is equal to the film thickness FT2 of the semiconductor layer SL and for example, set to about 180 to 250 nm. Moreover, a width WD1 of the optical waveguide WO11 in the X-axis direction is, for example, about 100 to 500 nm. An impurity is introduced into the optical waveguide WO11, and its impurity concentration is, for example, in a range of $10^{15}$ to $10^{19}$ $cm^{-3}$, and its typical value is set to, for example, about $10^{15}$ $cm^{-3}$.

On an upper surface TS1 of the insulating layer CL and a front surface of each of the two optical waveguides WO11, an insulating film IF1 is formed. The insulating film IF1 is formed on the upper surface TS1 of the insulating layer CL corresponding to the portion exposed from the optical waveguide WO11 and on two side surfaces SS1 and an upper surface TS2 of each of the optical waveguides WO11. That is, the insulating film IF1 is formed along the upper surface TS1 of the insulating layer CL and the front surface of each of the two optical waveguides WO11.

On the insulating film IF1, an insulating film IF2 made of, for example, silicon oxide is formed, and on the insulating film IF2, an insulating film IF3 made of, for example, silicon oxide, is formed. An insulating film section IF is formed by the insulating films IF1, IF2, and IF3. Moreover, the interlayer insulating film ID1 (see FIG. 1) is formed by the insulating film section IF and an insulating film IF4 (see FIG. 1).

The optical waveguides WO11 are made of silicon, and the insulating layer CL and the insulating films IF1, IF2, and IF3 are made of silicon oxide. Moreover, the optical waveguides WO11 are surrounded by the insulating layer CL and the insulating films IF1, IF2, and IF3. Relative to light having, for example, a wavelength of 1.55 μm, a refractive index of silicon is, for example, 3.5, and a refractive index of silicon oxide is, for example, 1.46, so that the refractive index of silicon is higher than the refractive index of silicon oxide. For this reason, the optical waveguides WO11 function as core layers, and the insulating layer CL and the insulating films IF1, IF2, and IF3 function as cladding layers.

A peripheral edge portion BS11 of a lower surface BS1 of each of the two optical waveguides WO11 and the insulating layer CL corresponding to the portion located under the peripheral edge portion BS11 are separated from each other in the thickness direction (Z-axis direction) of the insulating layer CL. In other words, the peripheral edge portion BS11 of the lower surface BS1 of each of the two optical waveguides WO11 is separated from the insulating layer CL.

Moreover, in an example shown in FIG. 2, a recessed portion CC1 is formed on the upper surface TS1 of the insulating layer CL, and when seen in a plan view, the recessed portion CC1 is overlapped with the peripheral edge portion BS11 of the lower surface BS1 of each of the optical waveguides WO11. However, supposing that a portion closer to the center than the peripheral edge portion BS11 of the lower surface BS1 of each of the optical waveguides WO11 is a center portion BS12, a height position of the upper surface TS1 of the insulating layer CL corresponding the portion exposed from the optical waveguide WO11 may be lower than a height position of the upper surface TS3 of the insulating layer CL corresponding to the portion located under the center portion BS12 of the lower surface BS1 of the optical waveguide WO11.

In the first embodiment, as described later with reference to FIG. 8 and FIG. 9, the insulating film IF1 made of silicon oxide is formed by the chemical vapor deposition (CVD) through use of, for example, a tetraethoxy silane (TEOS) gas or a raw material gas containing the TEOS gas and an oxygen ($O_2$) gas. The insulating film IF1 of this type has a characteristic of growing conformally in accordance with the shape, that is, shape adaptability and is buried between the peripheral edge portion BS11 of the lower surface BS1 of each of the two optical waveguides WO11 and the insulating layer CL. Thus, in the vicinity of the peripheral edge portion BS11, it becomes possible to prevent a space or a gap from being formed between the optical waveguides WO11 serving as core layers and the insulating layer CL and the insulating film IF1 serving as cladding layers. Accordingly, it becomes possible to prevent irregular reflection of light propagating through the optical waveguides WO11 due to the space or the gap, thereby improving the optical characteristics of the optical waveguides WO11.

Moreover, as described later with reference to FIG. 10, the insulating film IF2 made of silicon oxide is formed by the CVD through use of, for example, a raw material gas containing a tetraethoxy silane (TEOS) gas and an ozone ($O_3$) gas. The insulating film IF2 of this type which has good step coverage and good fluidity is buried between the two optical waveguides WO11, with the insulating film IF1 being interposed therebetween.

Between the two optical waveguides WO11, a recessed portion CC2 is formed. A bottom surface of the recessed portion CC2 corresponds to the upper surface TS1 of the insulating layer CL corresponding to the portion located between the two optical waveguides WO11, and the inner walls of the recessed portion CC2 correspond to side surfaces SS1 of the two optical waveguides WO11 opposed to each other. Thus, the recessed portion CC2 is buried by the insulating film IF2.

Figure 11:
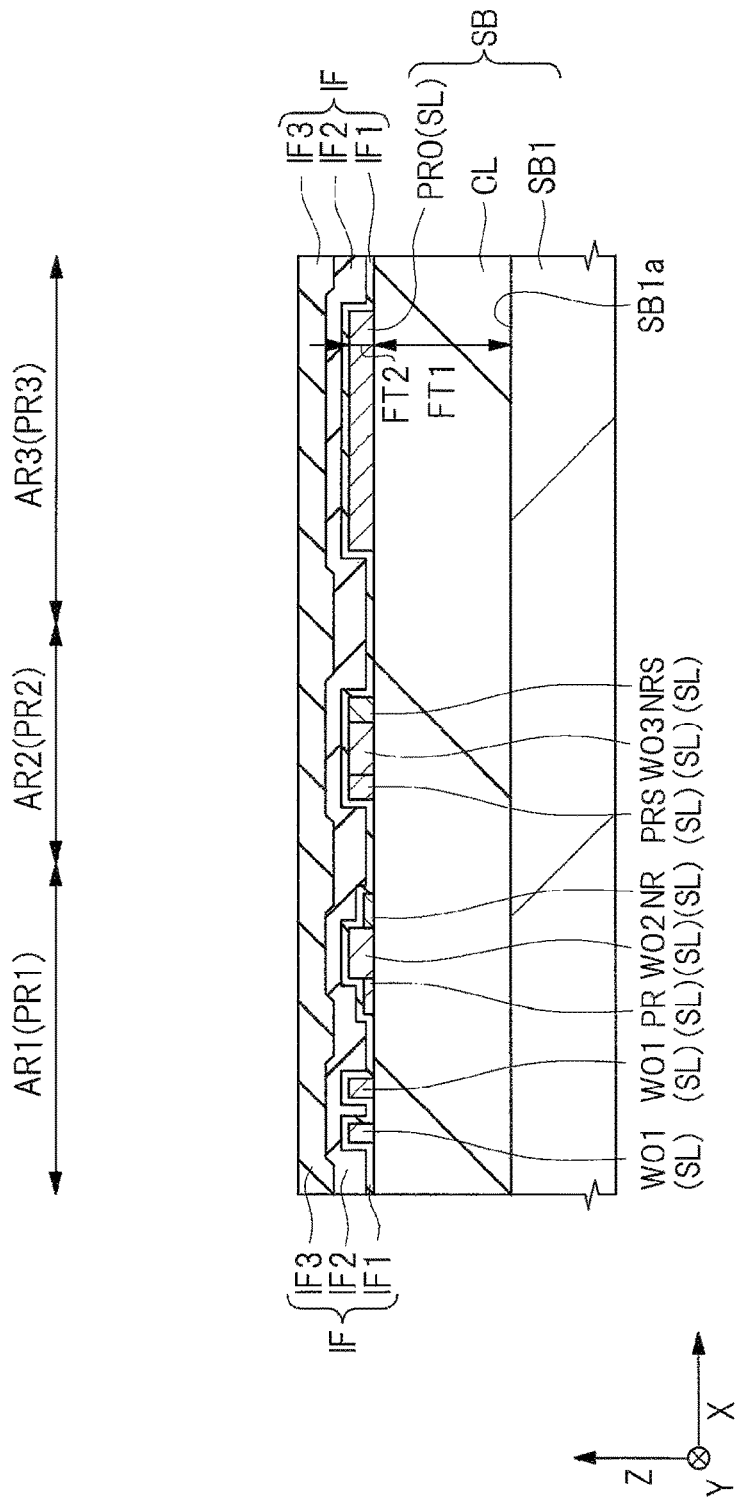
FIG. 11 is a cross-sectional view showing a main part during the manufacturing process of the semiconductor device of the first embodiment.

Also, as described later with reference to FIG. 11, the insulating film IF3 made of silicon oxide is formed by the PECVD (Plasma Enhanced Chemical Vapor Deposition), for example.

<Method for Manufacturing Semiconductor Device>

Next, a method for manufacturing the semiconductor device in accordance with the first embodiment will be described.

Figure 3:
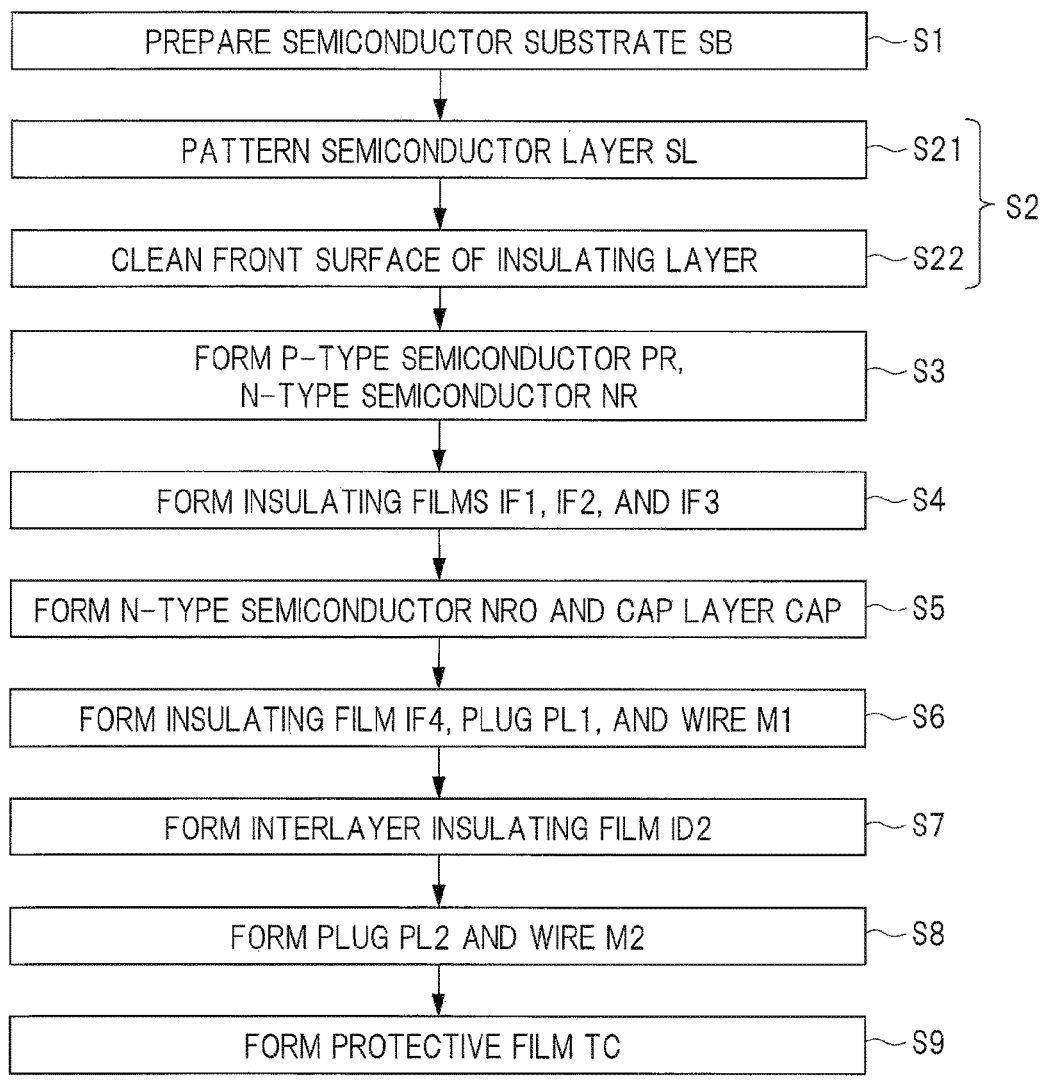
FIG. 3 is a process flow chart showing a part of a manufacturing process of the semiconductor device of the first embodiment.
Figure 4:
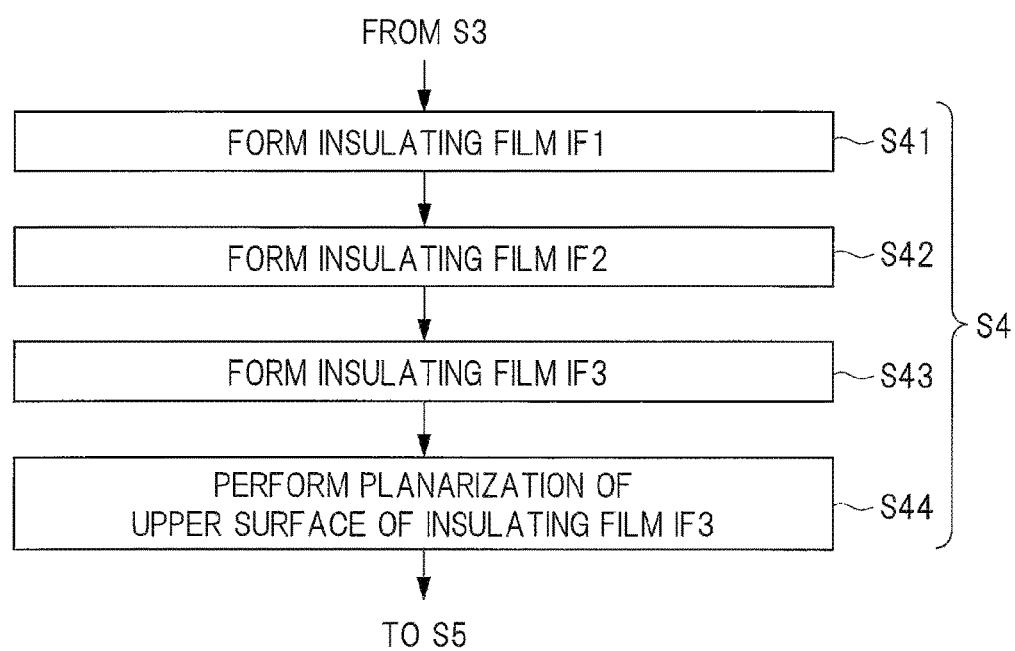
FIG. 4 is a process flow chart showing another part of the manufacturing process of the semiconductor device of the first embodiment.

FIG. 3 is a process flow chart showing a part of the manufacturing process of the semiconductor device of the first embodiment, and FIG. 4 is a process flow chart showing another part of the manufacturing process of the semiconductor device of the first embodiment. FIG. 4 shows a process included in step S4 of FIG. 3. Note that FIG. 3 and FIG. 4 mainly show the process in the region AR1 which is a region in which the optical signal transmission line section PR1 is formed.

Figure 5:
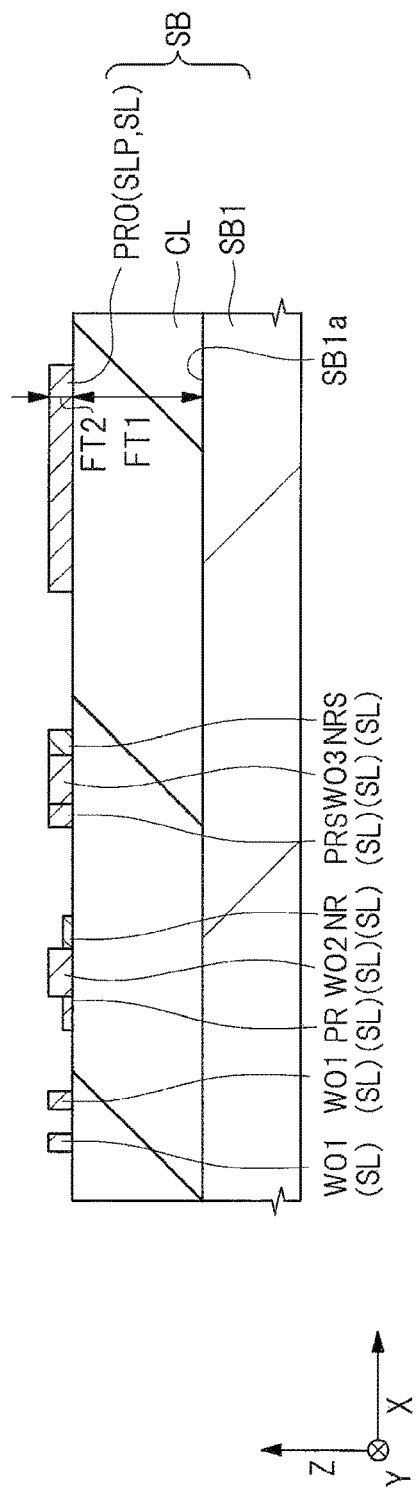
FIG. 5 is a cross-sectional view showing a main part during the manufacturing process of the semiconductor device of the first embodiment.
Figure 6:
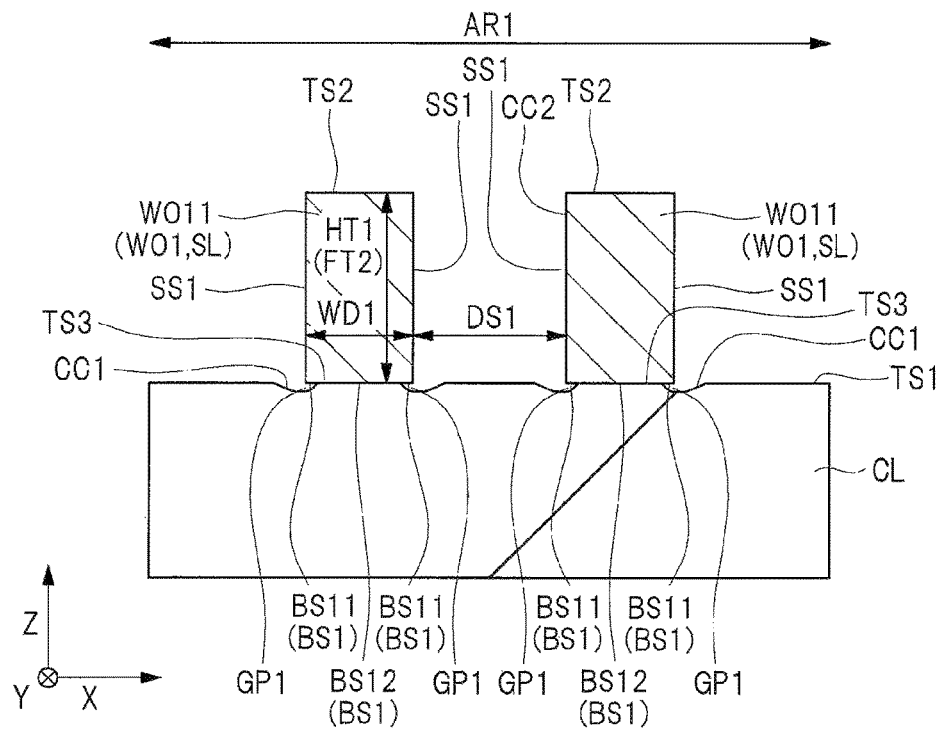
FIG. 6 is a cross-sectional view showing a main part during the manufacturing process of the semiconductor device of the first embodiment.
Figure 7:
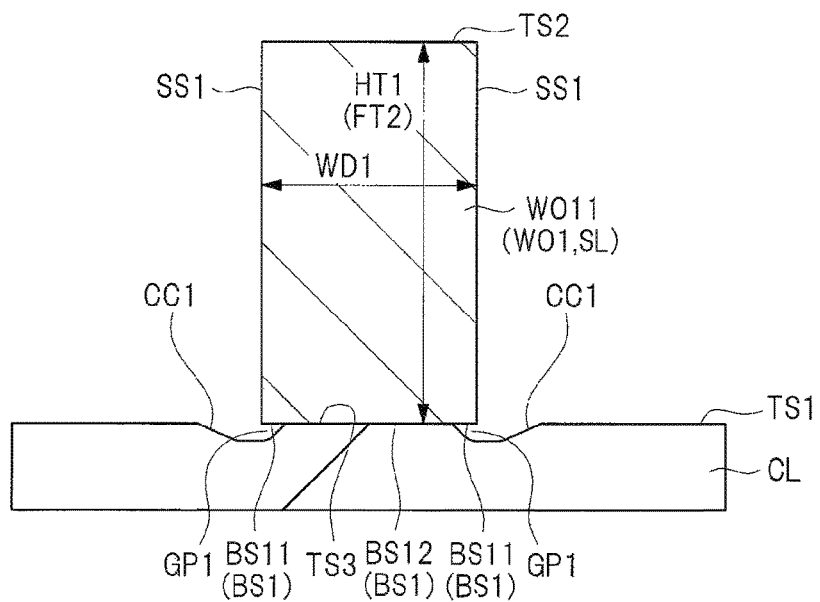
FIG. 7 is a cross-sectional view showing a main part during the manufacturing process of the semiconductor device of the first embodiment.
Figure 8:
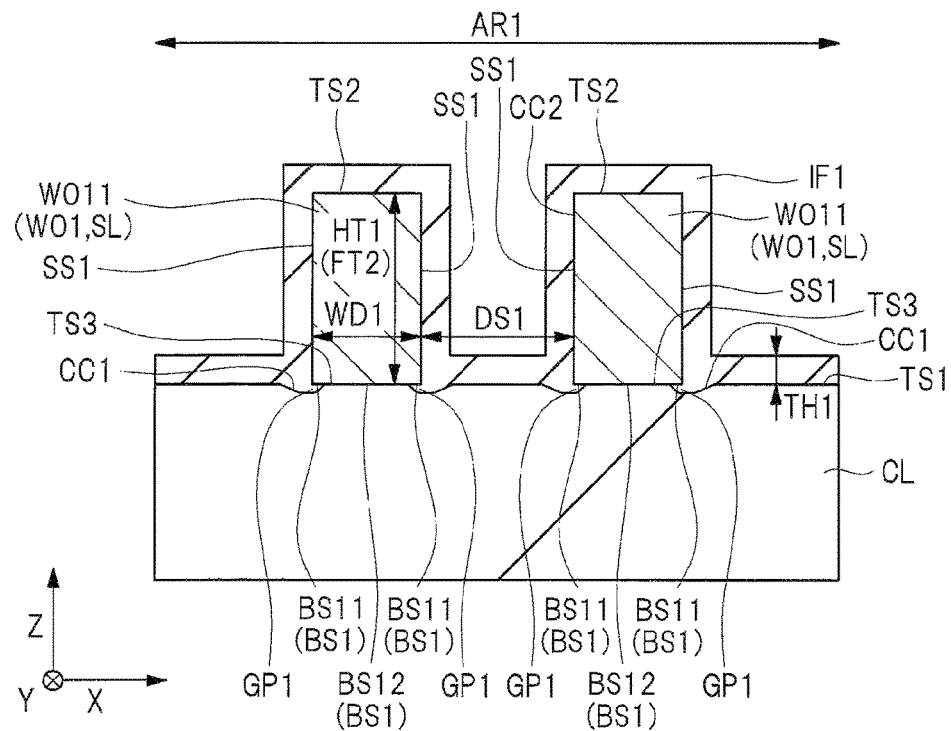
FIG. 8 is a cross-sectional view showing a main part during the manufacturing process of the semiconductor device of the first embodiment.
Figure 9:
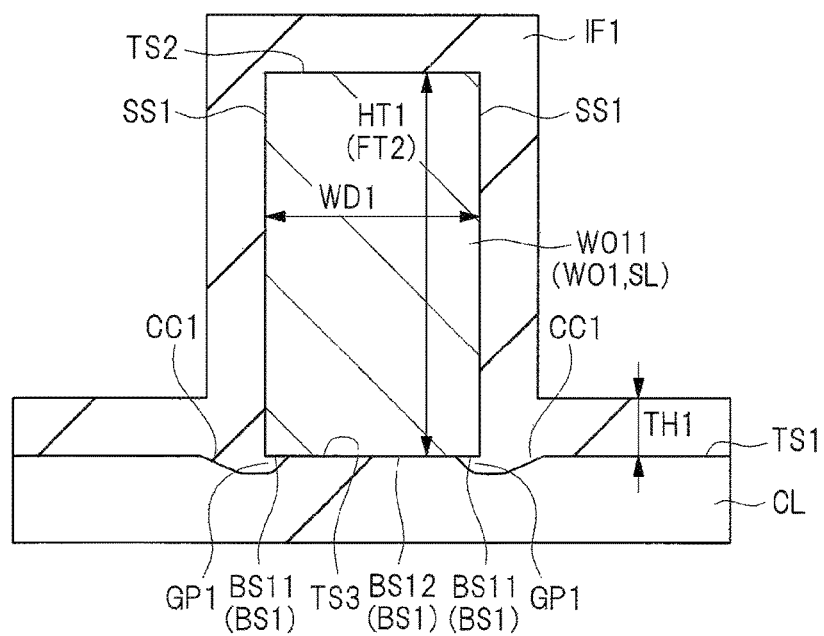
FIG. 9 is a cross-sectional view showing a main part during the manufacturing process of the semiconductor device of the first embodiment.
Figure 10:
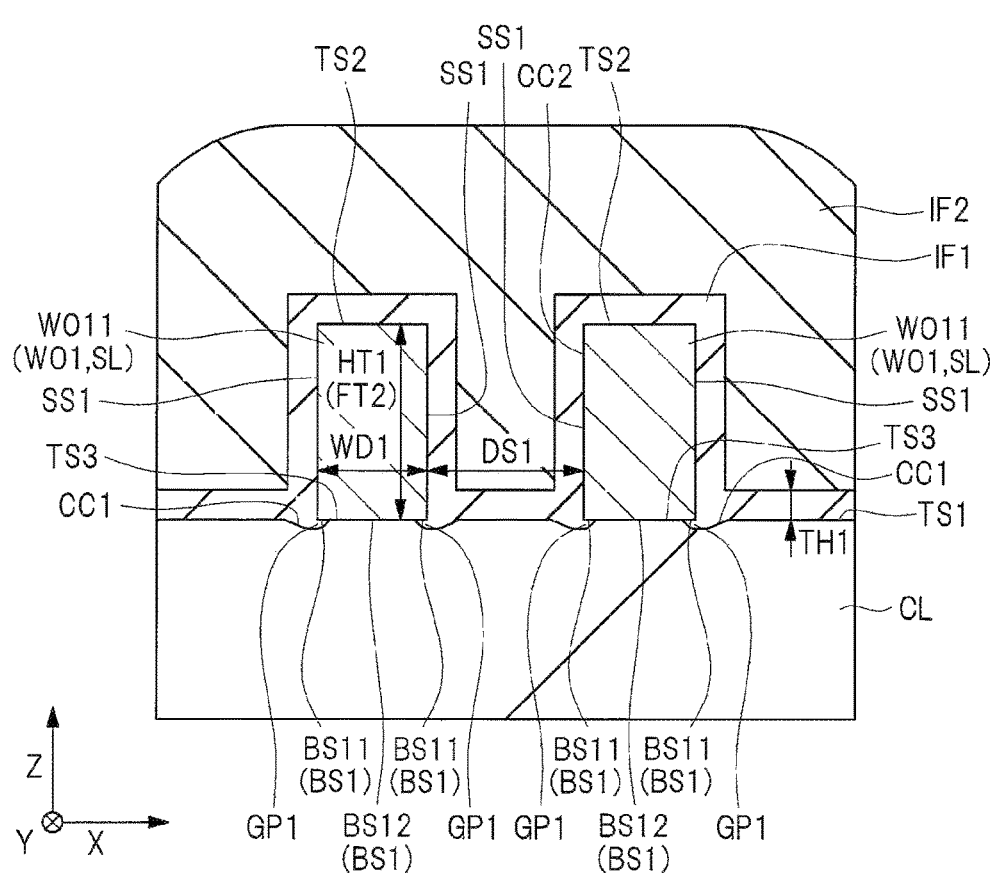
FIG. 10 is a cross-sectional view showing a main part during the manufacturing process of the semiconductor device of the first embodiment.

FIGS. 5 to 14 are cross-sectional views showing main parts during the manufacturing process of the semiconductor device of the first embodiment. Among these, FIG. 6, FIG. 8, and FIG. 10 show the region AR1 in which the optical signal transmission line section PR1 is formed in an enlarged manner. FIG. 7 and FIG. 9 show the peripheries of the optical waveguides WO11 of the optical signal transmission line section PR1 in the region AR1 in a more enlarged manner.

Cross-sectional views of FIG. 5 and FIG. 11 to FIG. 14 show states in which the optical signal transmission line section PR1 is formed in the region AR1 on the main surface SB1a side of the base substrate SB1, the optical modulation section PR2 is formed in the region AR2 on the main surface SB1a side of the base substrate SB1, and the photoelectric conversion section PR3 is formed in the region AR3 on the main surface SB1a side of the base substrate SB1.

First, as shown in FIG. 5, a semiconductor substrate SB is prepared (step S1 of FIG. 3). The semiconductor substrate SB is provided with the base substrate SB1, the insulating layer CL formed on the base substrate SB1, and the semiconductor layer SL formed on the insulating layer CL. The base substrate SB1 is composed of a p-type silicon single-crystal substrate having, for example, a plane direction of (100) and a resistivity of about 5 to 50 Ωcm. The insulating layer CL contains oxygen and silicon and is preferably made of, for example, a silicon oxide film. The semiconductor layer SL is formed by thinning the p-type silicon single-crystal substrate having, for example, a plane direction of (100) and a resistivity of about 5 to 50 Ωcm. The film thickness FT1 of the insulating layer CL and the film thickness FT2 of the semiconductor layer SL are the same as those described with reference to FIG. 1.

The base substrate SB1 is provided with regions AR1, AR2, and AR3 on the main surface SB1a side of the base substrate SB1. In the region AR1, the optical signal transmission line section PR1 is formed, in the region AR2, the optical modulation section PR2 is formed, and in the region AR3, the photoelectric conversion section PR3 is formed.

Next, the semiconductor layer SL is patterned (step S2 of FIG. 3).

In this step S2, first, as shown in FIG. 5, the semiconductor layer SL is patterned through use of the photolithography technique and the etching technique (step S21 of FIG. 3). Thus, in the region AR1, the optical waveguides WO1 and WO2 composed of the semiconductor layer SL are formed on the insulating layer CL, and in the region AR2, the optical waveguide WO3 composed of the semiconductor layer SL is formed, and in the region AR3, a semiconductor section SLP composed of the semiconductor layer SL is formed.

As shown in FIG. 6 and FIG. 7, in the region AR1, for example, two optical waveguides WO11, each serving as the optical waveguide WO1 composed of the semiconductor layer SL, are formed on the insulating layer CL. When seen in a plan view, the two optical waveguides WO11 respectively extend in the Y-axis direction and are disposed to be spaced apart from each other in the X-axis direction. Moreover, between the two optical waveguides WO11, a recessed portion CC2 is formed. The bottom surface of the recessed portion CC2 corresponds to the upper surface TS1 of the insulating layer CL corresponding to the portion located between the two optical waveguides WO11, and inner walls of the recessed portion CC2 correspond to the side surfaces SS1 that are opposed to each other of the two optical waveguides WO11.

The height HT1 of each of the two optical waveguides WO11 is equal to the film thickness FT2 of the semiconductor layer SL and preferably set to, for example, about 180 to 250 nm. Meanwhile, supposing that the distance between the side surfaces SS1 that are opposed to each other of the two optical waveguides WO11 is a distance DS1 of the two optical waveguides WO1, the ratio RT1 of the distance DS1 relative to the height HT1 can be set to 1.5 or less.

Figure 15:
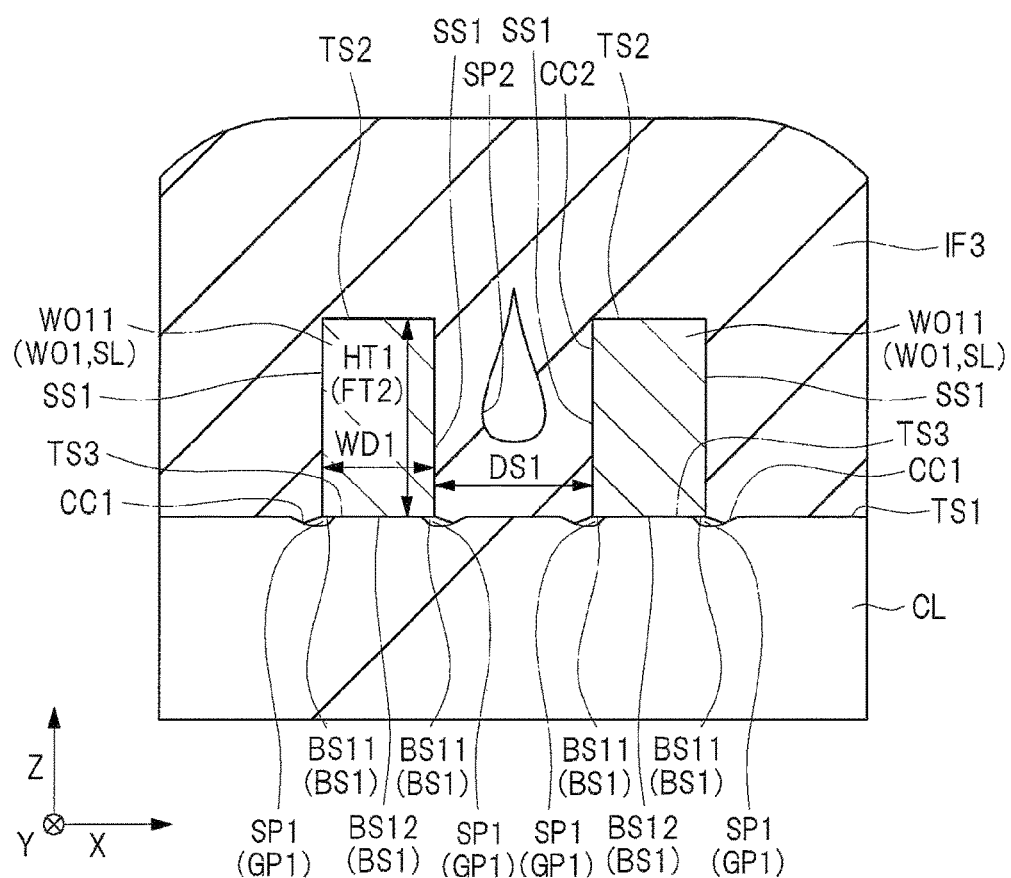
FIG. 15 is a cross-sectional view showing a main part of a semiconductor device in accordance with a comparative example.
Figure 16:
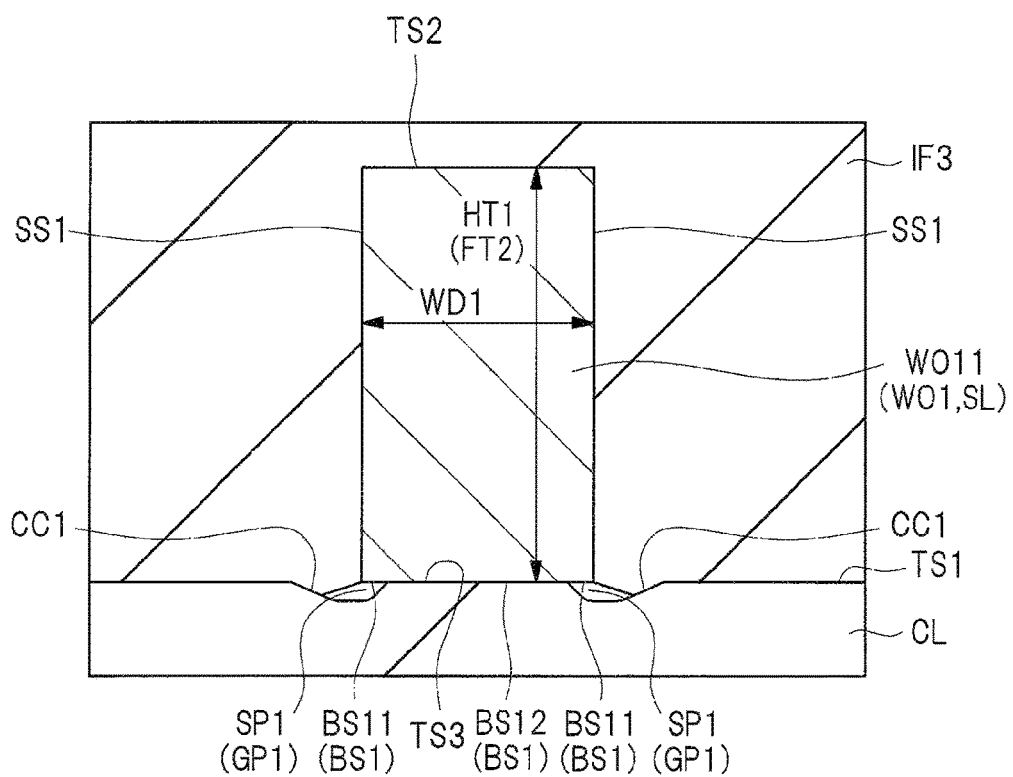
FIG. 16 is a cross-sectional view showing a main part of the semiconductor device in accordance with the comparative example.

In a case in which the ratio RT1 is set to 1.5 or less, as described later with reference to FIG. 15 and FIG. 16, when the insulating film IF3 is formed on the insulating layer CL without forming the insulating films IF1 and IF2 thereon, a space SP2 tends to be easily formed between the two optical waveguides WO11. Accordingly, in the first embodiment, in a case in which the ratio RT1 is set to 1.5 or less, by forming the insulating films IF1 and IF2 prior to the formation of the insulating film IF3, it becomes possible to improve an effect for preventing or suppressing formation of the space SP2 between the two optical waveguides WO11.

More preferably, the ratio RT1 may be set to 1.0 or less. In a case in which the ratio RT1 is set to 1.0 or less, when the insulating film IF3 is formed on the insulating layer CL without forming the insulating films IF1 and IF2 thereon, the space SP2 tends to be more easily formed between the two optical waveguides WO11. Accordingly, in the first embodiment, in a case in which the ratio RT1 is set to 1.0 or less, by forming the insulating films IF1 and IF2 prior to the formation of the insulating film IF3, it becomes possible to further improve an effect for preventing or suppressing the formation of the space SP2 between the two optical waveguides WO11.

In this step S2, next, after patterning the semiconductor layer SL in step S21, a front surface of the insulating layer CL may be cleaned (step S22 of FIG. 3).

In this step S22, the front surface of the insulating layer CL can be cleaned by using, for example, a cleaning liquid containing hydrofluoric acid. In this case, when the insulating layer CL contains oxygen and silicon, the upper surface TS1 of the insulating layer CL corresponding to the portion exposed from the optical waveguide WO11 is slightly etched by being made in contact with the cleaning liquid. Meanwhile, the insulating layer CL corresponding to the portion adjacent to the optical waveguide WO11 when seen in a plan view tends to be more easily made in contact with the cleaning liquid due to, for example, capillary phenomenon, compared to the insulating layer CL corresponding to the other portions. For this reason, upon carrying out the cleaning process of the front surface of the insulating layer CL, as shown in FIG. 6 and FIG. 7, between the peripheral edge portion BS11 of the lower surface BS1 of each of the two optical waveguides WO11 and the insulating layer CL corresponding to the portion located under the peripheral edge portion BS11, a gap GP1 is formed. That is, the peripheral edge portion BS11 of the lower surface BS1 of each of the optical waveguides WO11 and the insulating layer CL corresponding to the portion located under the peripheral edge portion BS11 are separated from each other in the Z-axis direction, that is, the thickness direction of the insulating layer CL.

Note that, in the example shown in FIG. 6 and FIG. 7, the recessed portion CC1 is formed on the upper surface TS1 of the insulating layer CL, and when seen in a plan view, the recessed portion CC1 is overlapped with the peripheral edge portion BS11 of the lower surface BS1 of each of the optical waveguides WO1. However, the insulating layer CL corresponding to the portion exposed from the optical waveguide WO11 is uniformly etched, so that the upper surface TS1 of the insulating layer CL corresponding to the portion exposed from the optical waveguide WO11 can be made lower than the height of the upper surface TS3 of the insulating layer CL corresponding to the portion located under the center portion BS12 of the lower surface BS1 of the optical waveguide WO11.

Moreover, upon patterning the semiconductor layer SL by dry etching, the gap GP1 may be formed between the peripheral edge portion BS11 of the lower surface BS1 of each of the optical waveguides WO11 and the insulating layer CL corresponding to the portion located under the peripheral edge portion BS11.

Next, as shown in FIG. 5, the p-type semiconductor PR and the n-type semiconductor NR are formed (step S3 of FIG. 3).

In this step S3, in the regions AR1, AR2, and AR3, a p-type impurity is introduced into the semiconductor layer SL by the ion implantation in which a resist pattern (not shown) is used as a mask. At this time, in the region AR1, the p-type impurity is introduced into the semiconductor layer SL on the one side (left side in FIG. 5) of the optical waveguide WO2 in the X-axis direction, so that a p-type semiconductor PR is formed. Moreover, in the region AR2, the p-type impurity is introduced into the semiconductor layer SL corresponding to the portion located on the one side (left side in FIG. 5) of the optical waveguide WO3 in the X-axis direction, so that a p-type semiconductor PRS is formed. Furthermore, in the region AR3, the p-type impurity is introduced into the semiconductor section SLP composed of the semiconductor layer SL, so that a p-type semiconductor PRO is formed.

Moreover, in the step S3, in the regions AR1, AR2, and AR3, an n-type impurity is introduced into the semiconductor layer SL by the ion implantation in which a resist pattern (not shown) is used as a mask. At this time, in the region AR1, the n-type impurity is introduced into the semiconductor layer SL on the other side (right side in FIG. 5) of the optical waveguide WO2 in the X-axis direction, so that an n-type semiconductor NR is formed. Moreover, in the region AR2, the n-type impurity is introduced into the semiconductor layer SL corresponding to the portion located on the other side (right side in FIG. 5) of the optical waveguide WO3 in the X-axis direction, so that an n-type semiconductor NRS is formed.

Note that, after the p-type impurity and the n-type impurity have been introduced, a heat treatment may be carried out to activate the impurities thus introduced.

Next, as shown in FIG. 8 to FIG. 10 and FIG. 2, the insulating films IF1, IF2, and IF3 are formed (step S4 of FIG. 3). In this step S4, the insulating films IF1, IF2, and IF3 are successively stacked, so that an insulating film section IF composed of the successively stacked insulating films IF1, IF2, and IF3 is formed.

In this step S4, first, as shown in FIG. 8 and FIG. 9, the insulating film IF1 is formed (step S41 in FIG. 4). In this step S41, the insulating film IF1 is formed along the upper surface TS1 of the insulating layer CL and the front surface of the optical waveguide WO11.

Preferably, the insulating film IF1 made of silicon oxide is formed by the CVD through use of a tetraethoxy silane (TEOS) gas or a raw material gas containing a TEOS gas and an oxygen ($O_2$) gas. Alternatively, preferably, the insulating film IF1 made of silicon oxide is formed by the CVD through use of a raw material gas containing a silane ($SiH_4$) gas and a nitrous oxide ($N_2O$) gas. Alternatively, the insulating film IF1 made of silicon oxide is formed by the CVD through use of a raw material gas containing a dichlorosilane ($SiH_2Cl_2$) gas and a nitrous oxide ($N_2O$) gas.

More preferably, the insulating film IF1 made of silicon oxide may be formed by the LPCVD (Low Pressure Chemical Vapor Deposition). More specifically, in a case in which the insulating film IF1 is formed by the LPCVD through use of a raw material gas containing a TEOS gas and an oxygen gas, the film-forming process may be carried out, for example, at a pressure of about 10 to 100 Pa and at a temperature of about 600 to 850° C. Moreover, the film thickness TH1 of the insulating film IF1 may be set to, for example, about 50 to 200 nm.

The silicon oxide film formed by the CVD through use of the above-described gas has a characteristic of growing conformally in accordance with the shape, that is, shape adaptability. For this reason, the resulting insulating film IF1 can be formed on the side surfaces SS1 and the upper surface TS2 of the optical waveguide WO11, with a uniform film thickness. Thus, the side surfaces SS1 and the upper surface TS2 of the optical waveguide WO11 serving as core layers are uniformly covered with the insulating film IF1 serving as the cladding layer. For this reason, light propagating through the optical waveguide WO1 can be easily confined inside the optical waveguide WO11 serving as the core layer, so that it is possible to enhance optical characteristics of light propagating through the optical waveguide WO11.

Meanwhile, in step S41, the insulating film IF1 is formed on the upper surface TS1 of the insulating layer CL corresponding to the portion adjacent to the side surfaces SS1 of the optical waveguide WO11, when seen in a plan view, and the side surfaces SS1 of the optical waveguide WO11. Since the silicon oxide film formed by the CVD through use of the above-described gas has shape adaptability as described above, it is formed so as to bury the recessed portion CC1 formed on the upper surface TS1 of the insulating layer CL and the gap GP1 between the peripheral edge portion BS11 of the lower surface BS1 of the optical waveguide WO11 and the insulating layer CL. For this reason, in step S41, the gap GP1 is buried by the insulating film IF1 having a refractive index substantially equal to the refractive index of the insulating layer CL. Accordingly, as described through use of FIG. 15 and FIG. 16 to be described later, it becomes possible to prevent light propagating through the optical waveguides WO11 from being irregularly reflected on the interface between the space SP1 remained in the gap GP1 and the optical waveguide WO11, compared to the comparative example in which the space SP1 is remained in the gap GP1, thereby improving the optical characteristics of the optical waveguide WO11.

Next, as shown in FIG. 10, the insulating film IF2 is formed (step S42 of FIG. 4). In this step S42, on the insulating film IF1, the insulating film IF2 made of silicon oxide is formed by the CVD through use of a raw material gas containing a tetraethoxy silane (TEOS) gas and an ozone ($O_3$) gas. The silicon oxide film formed by the CVD through use of the raw material gas containing the ozone gas and the TEOS gas is referred to as an $O_3$TEOS film.

Preferably, by the SACVD (Sub Atmospheric Chemical Vapor Deposition) as the CVD in which the raw material gas containing an ozone gas and a TEOS gas is used, the insulating film IF2 made of silicon oxide can be formed. The pressure at the time of the film formation by the SACVD is lower than the atmospheric pressure which is the pressure at the time of the film formation by the APCVD (Atmospheric Pressure Chemical Vapor Deposition) and is greater than a pressure of about 13 to 390 Pa which is the pressure at the time of the film formation by the LPCVD. More specifically, the pressure at the time of the film formation by the SACVD is greater than, for example, 390 Pa, and smaller than 0.1 MPa. That is, in step S42, the insulating film IF2 is formed by the CVD at a pressure higher than the pressure at the time of the formation of the insulating film IF1 by the CVD at step S41.

This $O_3$TEOS film has good step coverage and good fluidity. That is, the $O_3$TEOS film has a gap-burying characteristic, that is, a gap-filling property. Accordingly, as shown in FIG. 10, the insulating film IF2 can be buried between the side surfaces SS1 of the two optical waveguides WO11 that are opposed to each other with the insulating film IF1 interposed therebetween. That is, the inside of the recessed portion CC2 having the side surfaces SS1 of the two optical waveguides WO11 that are opposed to each other as the inner walls and the upper surface TS1 of the insulating layer CL corresponding to the portion located between the two optical waveguides WO11 as the bottom surface can be buried by the insulating film IF2 with the insulating film IF1 interposed therebetween.

More specifically, in a case in which the insulating film IF2 is formed by the CVD in which the raw material gas containing an ozone gas and a TEOS gas is used, the film-forming process may be carried out, for example, at a pressure of about 0.01 to 0.1 MPa and at a temperature of about 450 to 600° C. Moreover, the film thickness of the insulating film IF2 may be set to, for example, about 2 μm. Note that a film thickness of the insulating film IF2 refers to a film thickness of the insulating film IF2 in a flat region, with no optical waveguide WO11 being formed.

Next, as shown in FIG. 2, the insulating film IF3 is formed (step S43 of FIG. 4). In this step S43, on the insulating film IF2, the insulating film IF3 made of silicon oxide is formed by the PECVD (Plasma Enhanced Chemical Vapor Deposition).

Preferably, the insulating film IF3 made of silicon oxide is formed by the PECVD through use of a raw material gas containing a tetraethoxy silane (TEOS) gas and an oxygen ($O_2$) gas or a raw material gas containing a silane ($SiH_4$) gas and a nitrous oxide ($N_2O$) gas. In accordance with this PECVD, a silicon oxide film can be formed at a high film-forming speed even at a low temperature.

Meanwhile, the step coverage of the silicon oxide film formed by the PECVD is lower than that of the $O_3$TEOS film, and the fluidity of the silicon oxide film formed by the PECVD is also lower than that of the $O_3$TEOS film. However, the insulating film IF2 is buried between the respective side surfaces SS1 of the two optical waveguides WO11, and the step on the upper surface of the insulating film IF2 becomes a step having an extremely small difference in height compared to the step caused by the side surfaces SS1 between the two optical waveguides WO11. Accordingly, the step on the upper surface of the insulating film IF3 formed on the insulating film IF2 also becomes a step having an extremely small difference in height compared to the step caused by the side surfaces SS1 between the two optical waveguides WO11.

More specifically, in a case in which the insulating film IF3 is formed by the PECVD in which the raw material gas containing a TEOS gas and an oxygen gas is used, the film-forming process can be carried out, for example, at a pressure of about 10 to 1000 Pa and at a temperature of about 350 to 500° C.

Note that, in place of the silicon oxide, an insulating film IF3 made of, for example, BPSG (Boron Phosphorus Silicon Glass) may be formed as the insulating film IF3. The resulting merit is that, by adding an annealing process at 800° C. or more, the insulating film IF3 made of the BPSG is subjected to a reflow process, thereby making it possible to improve the flatness.

Next, as shown in FIG. 2, the upper surface of the insulating film IF3 is planarized (step S44 of FIG. 4). In this step S44, the upper surface of the insulating film IF3 can be planarized by the CMP (Chemical Mechanical Polishing), for example.

In this manner, the process of step S4 is carried out, so that in the regions AR1, AR2, and AR3, the insulating films IF1, IF2, and IF3 are formed on the insulating layer CL so as to cover the optical waveguides WO1, WO2, and WO3 and the p-type semiconductor PRO, and the insulating film section IF composed of the insulating films IF1, IF2, and IF3 is formed. FIG. 11 is a cross-sectional view showing main parts in the regions AR1, AR2, and AR3 after the process of step S4 has been carried out.

Figure 12:
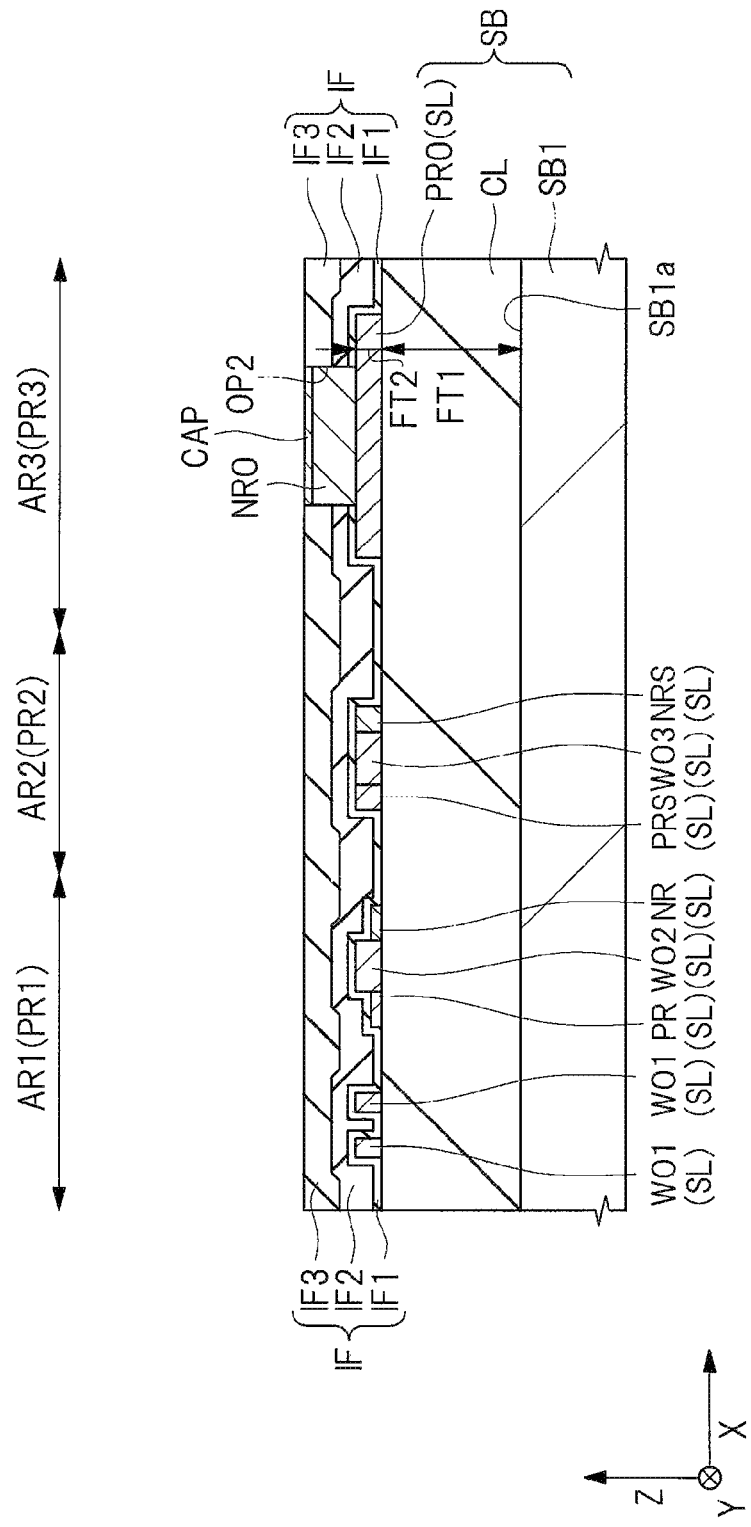
FIG. 12 is a cross-sectional view showing a main part during the manufacturing process of the semiconductor device of the first embodiment.

Next, as shown in FIG. 12, the n-type semiconductor NRO and the cap layer CAP are formed (step S5 of FIG. 3).

In this step S5, first, by patterning the insulating film section IF through use of the photolithography technique and the etching technique, an opening OP2 that penetrates the insulating film section IF to reach the p-type semiconductor PRO is formed in the insulating film section IF in the region AR3.

In this step S5, next, on the p-type semiconductor PRO corresponding to a portion exposed on the bottom of the opening OP2, an n-type semiconductor NRO made of germanium is formed. After a semiconductor film made of germanium has been epitaxially grown on the p-type semiconductor PRO through use of, for example, the CVD, by introducing an n-type impurity to the semiconductor film by the ion implantation, the n-type semiconductor NRO can be formed. Alternatively, upon allowing the semiconductor film made of germanium to epitaxially grow through use of, for example, the CVD, the epitaxial growth is carried out through use of a raw material gas containing an n-type impurity, so that the n-type semiconductor NRO can be formed. The p-type semiconductor PRO and the n-type semiconductor NRO made of germanium and formed on the p-type semiconductor PRO forms a photoelectric conversion section PR3.

In this step S5, next, on the n-type semiconductor NRO, a cap layer CAP is formed. As described above, the cap layer CAP prevents damage such as surface roughness or reduction in film thickness of germanium forming the n-type semiconductor NRO. After the semiconductor film made of silicon has been epitaxially grown through use of the CVD, for example, the cap layer CAP can be formed by introducing an n-type impurity into the semiconductor film by the ion implantation.

Figure 13:
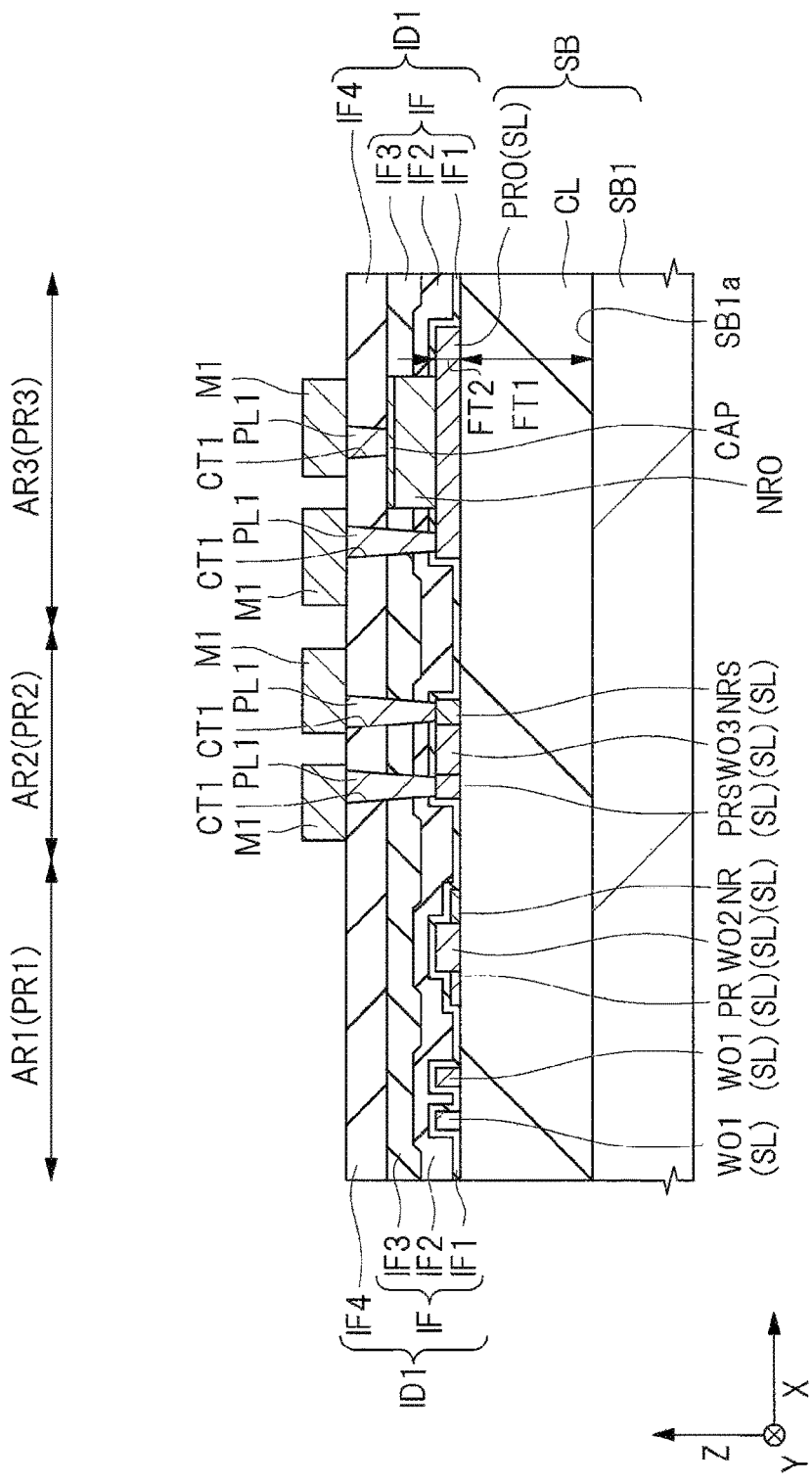
FIG. 13 is a cross-sectional view showing a main part during the manufacturing process of the semiconductor device of the first embodiment.

Next, as shown in FIG. 13, the insulating film IF4, the plug PL1, and the wire M1 are formed (step S6 of FIG. 3).

In this step S6, first, as shown in FIG. 13, the insulating film IF4 is formed. For example, on the insulating film IF3, the insulating film IF4 made of, for example, a silicon oxide film or the like is formed by the CVD or the like. Thus, in the regions AR1, AR2, and AR3, an interlayer insulating film ID1 composed of the insulating film section IF and the insulating film IF4 is formed on the insulating layer CL so as to cover the optical waveguides WO1, WO2, and WO3, the p-type semiconductor PRO, the n-type semiconductor NRO, and the cap layer CAP.

In this step S6, next, as shown in FIG. 13, the interlayer insulating film ID1 is patterned through use of the photolithography technique and the etching technique. Thus, connection holes CT1 that penetrate the interlayer insulating film ID1 to reach the p-type semiconductor PRS and the n-type semiconductor NRS in the region AR2, and the p-type semiconductor PRO and the cap layer CAP in the region AR3, respectively, are formed.

In this step S6, next, as shown in FIG. 13, a conductor film made of, for example, tungsten, is buried inside the connection hole CT1. Thus, the plug PL1 made of the conductor film that is buried inside the connection hole CT1 is formed.

In this step S6, next, as shown in FIG. 13, the wire M1 is formed. More specifically, a conductor film made of, for example, aluminum-copper alloy is formed on the interlayer insulating film ID1, and by patterning the conductor film thus formed, the wire M1 made of the conductor film is formed. Note that the wire M1 may be formed by the single damascene method using copper (Cu) as a main conductor material.

Figure 14:
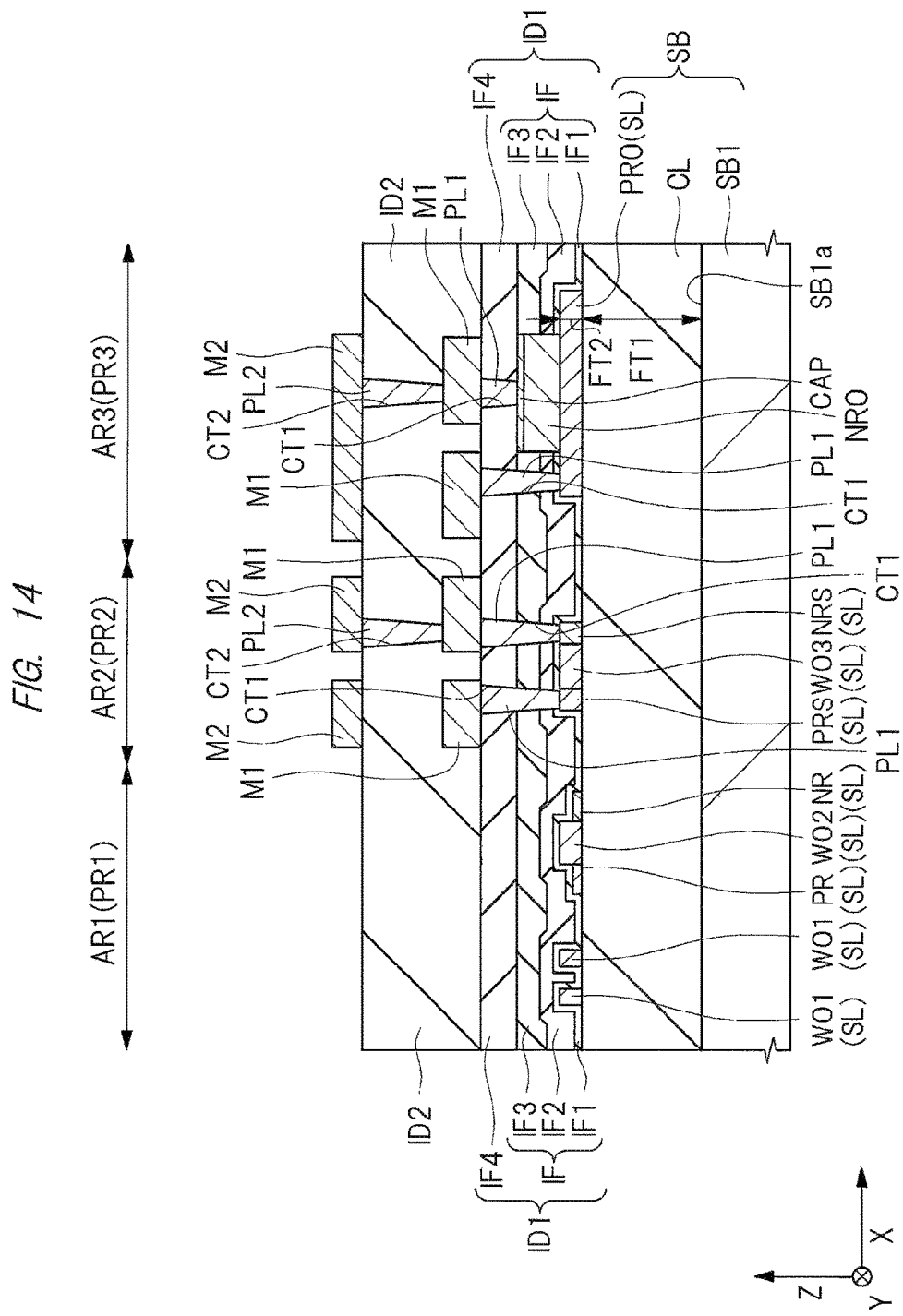
FIG. 14 is a cross-sectional view showing a main part during the manufacturing process of the semiconductor device of the first embodiment.

Next, as shown in FIG. 14, an interlayer insulating film ID2 is formed (step S7 of FIG. 3). In this step S7, for example, the interlayer insulating film ID2 made of, for example, a silicon oxide film or the like is formed on the interlayer insulating film ID1 by the CVD or the like so as to cover the wire M1.

Next, as shown in FIG. 14, a plug PL2 and a wire M2 are formed (step S8 of FIG. 3).

In this step S8, first, as shown in FIG. 14, the interlayer insulating film ID2 is patterned through use of the photolithography technique and the etching technique. Thus, in each of the regions AR2 and AR3, a connection hole CT2 that penetrates the interlayer insulating film ID2 to reach the wire M1 is formed.

In this step S8, next, as shown in FIG. 14, a conductor film made of, for example, tungsten, is buried inside the connection hole CT2. Thus, the plug PL2 made of the conductor film buried inside the connection hole CT2 is formed.

In this step S8, next, as shown in FIG. 14, a wire M2 is formed. More specifically, on the interlayer insulating film ID2, a conductor film made of, for example, aluminum-copper alloy is formed, and the conductor film thus formed is patterned. Thus, the wire M2 made of this conductor film is formed. Note that the wire M2 may be formed by the single damascene method using copper as a main conductor material.

Thereafter, a protective film TC such as, for example, a silicon oxide film, is formed (step S9 of FIG. 3), and, for example, in the region AR3, by forming an opening OP1 that penetrates the protective film TC to reach the wire M2, a semiconductor device shown in FIG. 1 is formed.

<Space Formed in Cladding Layer>

Next, a space formed in the cladding layer will be described compared to a semiconductor device in accordance with a comparative example. FIG. 15 and FIG. 16 are cross-sectional views showing main parts of the semiconductor device of the comparative example. FIG. 15 shows the periphery of the optical waveguide in an enlarged manner, and FIG. 16 shows the periphery of the recessed portion in FIG. 15 in an enlarged manner.

In a manufacturing method of the semiconductor device of the comparative example, after the optical waveguide WO11 has been formed by carrying out a process corresponding to step S2 of FIG. 3, a process for forming the insulating film IF3 is carried out in place of the process for forming the insulating films IF1, IF2, and IF3 (step S4 of FIG. 3). For this reason, as shown in FIG. 15, the semiconductor device of the comparative example is not provided with the insulating film IF1 formed along the upper surface TS1 of the insulating layer CL and the front surface of each of the two optical waveguides WO11, and the insulating film IF2 formed on the insulating film IF1. In place of these, on the upper surface TS1 of the insulating layer CL and the front surface of each of the two optical waveguides WO11, an insulating film IF3 made of, for example, silicon oxide, is directly formed by the PECVD, for example. The insulating film IF3 is formed on the upper surface TS1 of the insulating layer CL corresponding to a portion exposed from the insulating layer CL and on the two side surfaces SS1 and the upper surface TS2 of each of the optical waveguides WO11.

As described above with reference to FIG. 6 and FIG. 7, upon forming the optical waveguide WO11 by carrying out a process corresponding to step S2 of FIG. 3, a gap GP1 is formed between the peripheral edge portion BS11 of the lower surface BS1 of the optical waveguide WO11 and the insulating layer CL. Alternatively, a recessed portion CC1 is formed on the upper surface TS1 of the insulating layer CL, and when seen in a plan view, the recessed portion CC1 is overlapped with the peripheral edge portion BS11 of the lower surface BS1 of the optical waveguide WO11.

Photosensitive resist which is used upon forming the optical waveguide WO11 by patterning the semiconductor layer SL through use of, for example, the photolithography technique and the etching technique, is very difficult to be completely removed after the patterning process. For this reason, prior to carrying out the next process after the formation of the optical waveguide WO11, the upper surface TS1 of the insulating layer CL needs to be cleaned by using a cleaning liquid; however, upon cleaning the upper surface TS1 of the insulating layer CL, a gap GP1 is sometimes formed between the peripheral edge portion BS11 of the lower surface BS1 of the optical waveguide WO11 and the insulating layer CL. Alternatively, upon carrying out the etching process of the semiconductor layer SL, a gap GP1 is sometimes formed between the peripheral edge portion BS11 of the lower surface BS1 of the optical waveguide WO11 and the insulating layer CL.

As the miniaturization of the semiconductor device is developed, various dimensions of the optical waveguide WO11 become shorter, so that higher shape accuracy is required. In this case, in an exposure process upon forming the optical waveguide WO11 by patterning a semiconductor layer through use of the photolithography technique and the etching technique, a liquid immersion exposure process by using, for example, an argon fluoride (ArF) excimer laser is carried out in order to improve the resolution. In this case, however, it is difficult to completely remove a photosensitive resist used for the liquid immersion exposure in a resist pattern removing process after the patterning process. For this reason, prior to carrying out the next process after the formation of the optical waveguide WO11, it is necessary to carry out a cleaning process of the upper surface TS1 of the insulating layer CL by using a cleaning liquid containing, for example, hydrofluoric acid. Consequently, the above-described gap GP1 or the recessed portion CC1 tends to be more easily formed.

In this case, a silicon oxide film formed by the PECVD does not have a characteristic of growing conformally in accordance with the shape, that is, shape adaptability, compared to the silicon oxide film formed by the LPCVD through use of a raw material gas containing, for example, a TEOS gas and an oxygen gas. For this reason, the gap GP1 formed between the peripheral edge portion BS11 of the lower surface BS1 of the optical waveguide WO11 and the insulating layer CL is not buried by the insulating film IF3. Alternatively, the recessed portion CC1 formed on the upper surface TS1 of the insulating layer CL is not buried by the insulating film IF3.

Accordingly, in the comparative example, the space SP1 is formed in the gap GP1. Alternatively, in the comparative example, the space SP1 is formed in the recessed portion CC1. Consequently, for example, on the interface between the space SP1 and the optical waveguide WO11 and on the interface between the space SP1 and the insulating layer CL, light propagating through the optical waveguide WO11 is irregularly reflected to cause, for example, attenuation of the intensity of the light propagating through the optical waveguide WO11 or the like, and as a result, the optical characteristic of the optical waveguide WO11 deteriorates. For this reason, it is not possible to improve the performances of the semiconductor device.

Moreover, a relative dielectric constant in the space SP1 is equal to a relative dielectric constant of 1 of air, which is small compared to the refractive index 1.46 of the silicon oxide film. For this reason, the possibility that light propagating through the optical waveguide WO11 is irregularly reflected on the interface between the space SP1 and the optical waveguide WO11 and the interface between the space SP1 and the insulating layer CL becomes greater compared to the case where the gap GP1 or the recessed portion CC1 is buried by any material.

Meanwhile, the step coverage of the silicon oxide film formed by the PECVD is lower than that of the $O_3$TEOS film, and the fluidity of the silicon oxide film formed by the PECVD is also lower than that of the $O_3$TEOS film. Consequently, the insulating film IF3 is not buried between the two optical waveguides WO11.

Accordingly, in the comparative example, the space SP2 tends to be easily formed between the two optical waveguides WO11. For this reason, light propagating through the optical waveguide WO11 is irregularly reflected on the interface between the space SP2 and the insulating film IF3 to cause, for example, attenuation of the intensity of the light propagating through the optical waveguide WO11 or the like, and as a result, the optical characteristic of the optical waveguide WO11 deteriorates.

More specifically, in a case in which the ratio RT1 of the distance DS1 between the two optical waveguides WO11 relative to the height HT1 of each of the two optical waveguides WO11 is 1.5 or less, the space SP2 tends to be more easily formed between the two optical waveguides WO11. Moreover, in a case in which the ratio RT1 is 1.0 or less, the space SP2 is extremely easily formed between the two optical waveguides WO11.

Furthermore, the specific dielectric constant in the space SP2 is equal to the specific dielectric constant 1 of air, which is small compared to the refractive index 1.46 of the silicon oxide film. For this reason, the possibility that light propagating through the optical waveguide WO1 is irregularly reflected on the interface between the space SP2 and the insulating film IF3 becomes greater compared to the case where the gap between the two optical waveguides WO11 is buried by using any material.

<Main Characteristics and Effects of Present Embodiment>

In contrast, in the first embodiment, the semiconductor device is provided with the insulating film IF1 formed along the upper surface TS1 of the insulating layer CL and the front surface of the optical waveguide WO11. Moreover, the peripheral edge portion BS11 of the lower surface BS1 of the optical waveguide WO11 is separated from the insulating layer CL, and the insulating film IF1 is buried between the peripheral edge portion BS11 and the insulating layer CL.

By using this configuration, the insulating film IF1 can be made by a silicon oxide film formed by the CVD method using, for example, a raw material gas containing a TEOS gas and an oxygen gas. Such a silicon oxide film has a characteristic of growing conformally in accordance with the shape, that is, shape adaptability, compared to the silicon oxide film formed by the PECVD, for example. For this reason, it is possible to prevent or suppress the formation of a space between the peripheral edge portion BS11 and the insulating layer CL.

Accordingly, in the first embodiment, it is possible to prevent or suppress the formation of the space SP1 in the gap GP1. Alternatively, in the first embodiment, it is possible to prevent the formation of the space SP1 in the recessed portion CC1. Consequently, different from the comparative example, it is possible to prevent or suppress irregular reflection of light propagating through the optical waveguide WO11 on the interface between, for example, the space SP1 formed in the gap GP1 or the recessed portion CC1 and the optical waveguide WO11 and on the interface between the space SP1 formed in the gap GP1 or the recessed portion CC1 and the insulating layer CL. In this case, it is possible to prevent or suppress, for example, attenuation of the intensity of light propagating through the optical waveguide WO11, and consequently to improve the optical characteristics of the optical waveguide WO11. Accordingly, the performances of the semiconductor device can be improved.

In this manner, in the first embodiment, even when the gap GP1 or the recessed portion CC1 is formed, it is possible to prevent or suppress the formation of the space SP1 in the gap GP1 or the recessed portion CC1 thus formed. For this reason, even in a case in which a liquid immersion exposure is carried out in the exposure process upon patterning the semiconductor layer SL, prior to the next process after the formation of the optical waveguide WO11, by using, for example, a cleaning liquid containing hydrofluoric acid, the upper surface TS1 of the insulating layer CL can be sufficiently cleaned. Accordingly, in a case in which as the miniaturization of the semiconductor device is developed, various dimensions of the optical waveguide WO11 become shorter and higher shape accuracy is required, the effects of the semiconductor device of the first embodiment become more conspicuous.

Moreover, the semiconductor device of the first embodiment is preferably provided with the insulating film IF1 formed along the upper surface TS1 of the insulating layer CL and the front surface of each of the two optical waveguides WO11 disposed to be spaced apart from each other, and the insulating film IF2 formed on the insulating film IF1. Furthermore, the insulating film IF2 is buried between the two optical waveguides WO11, with the insulating film IF1 interposed therebetween.

With this configuration, the insulating film IF2 can be made of a silicon oxide film formed by the CVD through use of a raw material gas containing, for example, a TEOS gas and an ozone gas. This silicon oxide film has good step coverage and good fluidity compared to a silicon oxide film formed by the PECVD, for example.

As described above, in the comparative example, in a case in which the ratio RT1 of the distance DS1 between the two optical waveguides WO11 relative to the height HT1 of each of the two optical waveguides WO11 is set to 1.5 or less, the space SP2 tends to be easily formed between the two optical waveguides WO11. However, even in a case in which the ratio RT1 is 1.5 or less, in the first embodiment, it is possible to prevent or suppress the formation of the space SP2 between the two optical waveguides WO11 upon burying the insulating film IF2 between the two optical waveguides WO11.

(Second Embodiment)

In the semiconductor device of the first embodiment, the upper surface of the insulating film IF2 is not flat; however, the upper surface of the insulating film IF2 may be formed as a flat surface. Description will be given of such an example as a semiconductor device of a second embodiment. Note that, in the following, different points from the semiconductor device of the first embodiment will be mainly described.

<Structure on Periphery of Optical Waveguide and Method for Manufacturing Semiconductor Device>

Figure 17:
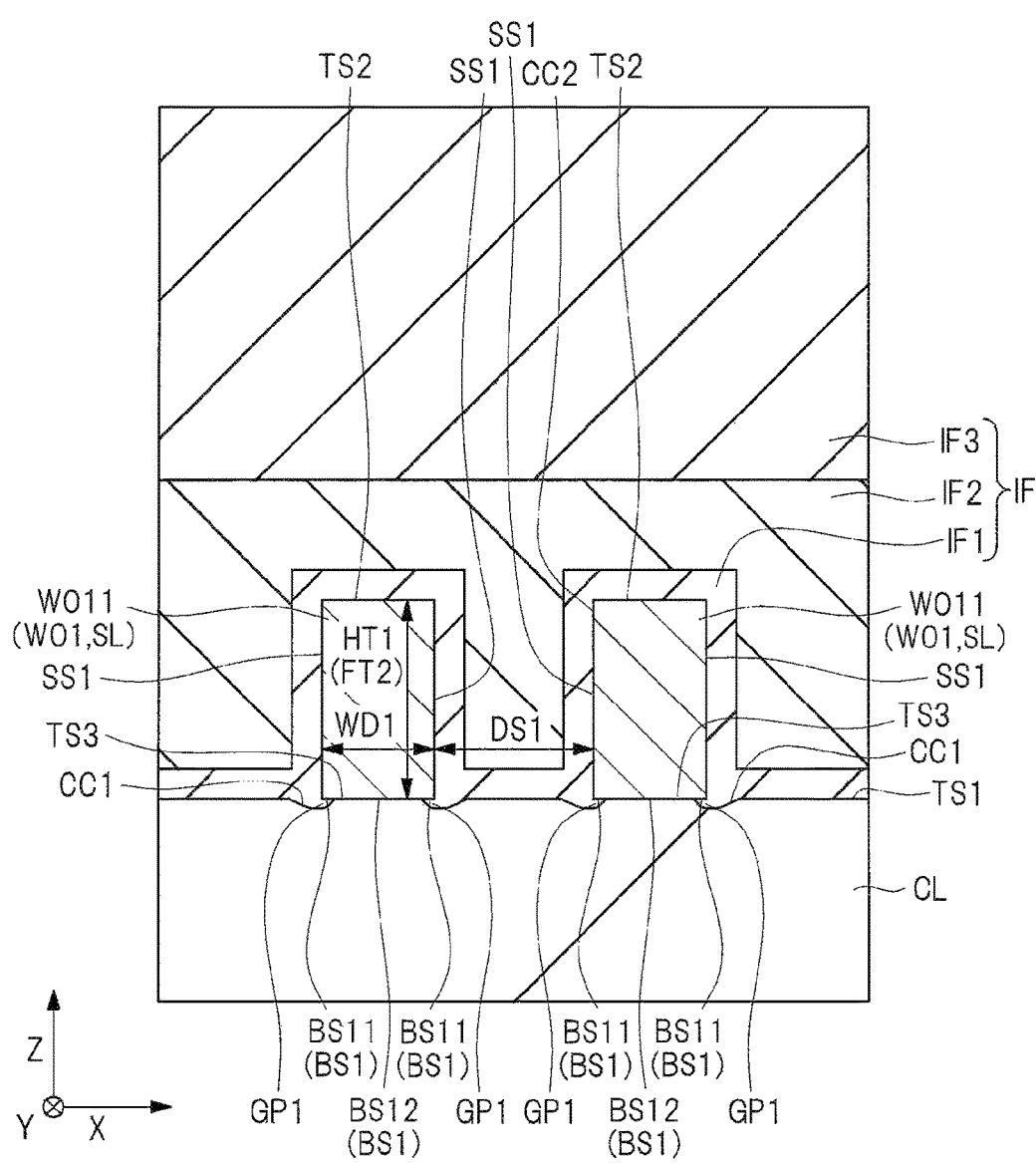
FIG. 17 is a cross-sectional view showing a main part of a semiconductor device in accordance with a second embodiment.
Figure 18:
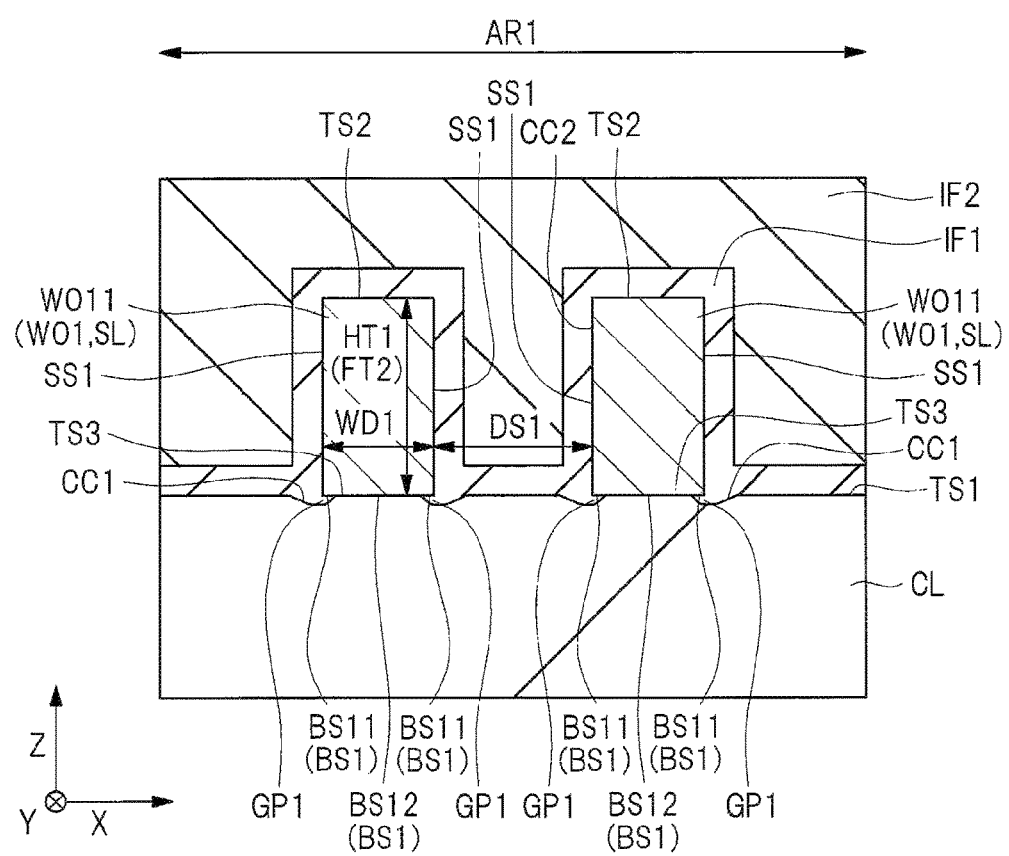
FIG. 18 is a cross-sectional view showing a main part during a manufacturing process of the semiconductor device of the second embodiment.

FIG. 17 is a cross-sectional view showing a main part of the semiconductor device in accordance with the second embodiment. FIG. 18 is a cross-sectional view showing a main part during a manufacturing process of the semiconductor device of the second embodiment. FIG. 17 and FIG. 18 show the structure on the periphery of an optical waveguide in an enlarged manner.

As shown in FIG. 17, different from the semiconductor device of the first embodiment, in the semiconductor device of the second embodiment, the upper surface of the insulating film IF2 is flat. Moreover, in the method for manufacturing the semiconductor device of the second embodiment, after the formation of the insulating film IF2 by carrying out step S42 of FIG. 4 as shown in FIG. 10, the upper surface of the insulating film IF2 is planarized as shown in FIG. 18 by carrying out step S43 of FIG. 4 as shown in FIG. 2, prior to the formation of the insulating film IF3.

<Main Characteristic and Effect of Present Embodiment>

The semiconductor device in accordance with the second embodiment has the same characteristics as those of the semiconductor device of the first embodiment and also has the same effects as those possessed by the semiconductor device of the first embodiment.

Meanwhile, in the semiconductor device of the second embodiment, the upper surface of the insulating film IF2 is flat.

As will be described later with reference to FIG. 19, there is sometimes a case in which the region AR1 includes a region AR11 and a region AR12 where the distance between the two optical waveguides WO1 is narrow in the region AR11 and the distance between the two optical waveguides WO1 is wide in the region AR12. In such a case, prior to the planarizing process of the insulating film. IF3, the height position of the upper surface of the insulating film section IF composed of the insulating films IF1, IF2, and IF3 in the region AR11 becomes higher than the height position of the upper surface of the insulating film section IF in the region AR12. In this case, a step referred to as a global step is formed between the upper surface of the insulating film section IF corresponding to the portion disposed in the region AR11 and the upper surface of the insulating film section IF corresponding to the portion disposed in the region AR12.

Since the insulating film IF2 is buried between the adjacent two optical waveguides WO11, an influence caused by the insulating film IF2 on the above-described global step is greater than the influence caused by the insulating films IF1 and IF3 on the global step, among the insulating films IF1, IF2, and IF3. Accordingly, in the second embodiment, it is possible to reduce the global step of the insulating film section IF by planarizing the upper surface of the insulating film IF2. Moreover, since in any of the portions in the region AR1, the height of the upper surface of the insulating film IF2 is uniformed, the optical characteristic of the optical waveguide WO1 can be uniformed even in any of the portions in the region AR1.

(Third Embodiment)

In the semiconductor device of the first embodiment, the distance between the two adjacent optical waveguides WO1 is set to a constant value in the region AR1. However, between the two regions included in the region AR1, the distance between the two adjacent optical waveguides WO1 may be made different. Description will be given of such an example as a semiconductor device of a third embodiment. Note that, in the following, different points from the semiconductor device of the first embodiment will be mainly described.

<Structure on Periphery of Optical Waveguide>

Figure 19:
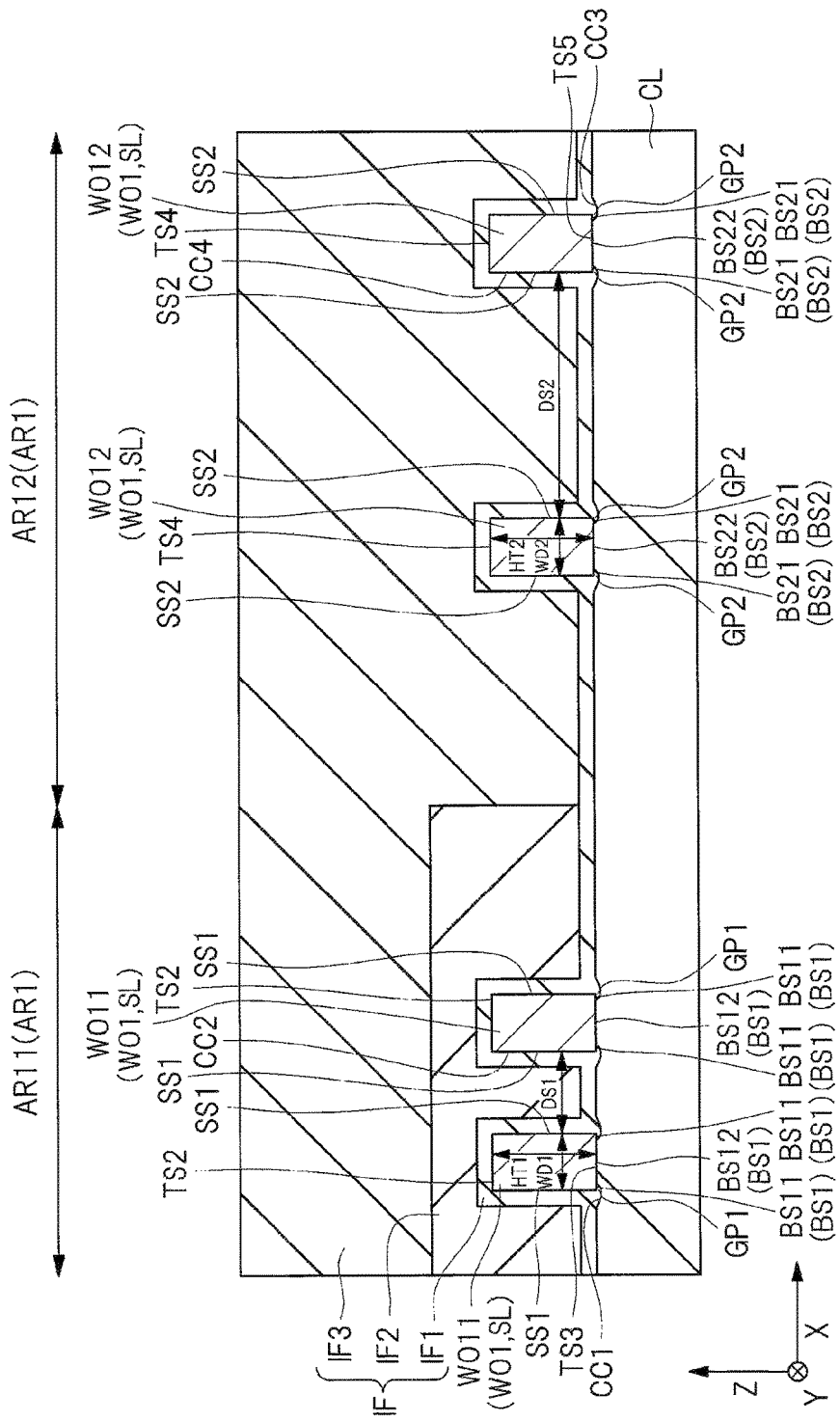
FIG. 19 is a cross-sectional view showing a main part of a semiconductor device in accordance with a third embodiment.

FIG. 19 is a cross-sectional view showing a main part of the semiconductor device in accordance with the third embodiment. FIG. 19 shows the structure on the periphery of an optical waveguide in an enlarged manner.

As shown in FIG. 19, the region AR1 includes a region AR11 on the main surface SB1a side (see FIG. 1) of the base substrate SB1 (see FIG. 1) and a region AR12 on the main surface SB1a side (see FIG. 1) of the base substrate SB1 (see FIG. 1). The insulating layer CL is formed on the base substrate SB1 in the regions AR11 and AR12. Moreover, the semiconductor device of the third embodiment is provided with two optical waveguides WO11 and two optical waveguides WO12.

The two optical waveguides WO11 are formed on the insulating layer CL in the region AR11. The two optical waveguides WO11 are composed of the semiconductor layer SL formed on the insulating layer CL in the region AR11, in the same manner as in the first embodiment. When seen in a plan view, the two optical waveguides WO11 are disposed to be spaced apart from each other in the X-axis direction.

The two optical waveguides WO12 are formed on the insulating layer CL in the region AR12. The two optical waveguides WO12 are composed of the semiconductor layer SL formed on the insulating layer CL in the region AR12. When seen in a plan view, the two optical waveguides WO12 are disposed to be spaced apart from each other in the X-axis direction.

Note that the direction in which the optical waveguides WO12 are disposed to be spaced apart from each other may be set to the same direction as the direction in which the optical waveguides WO11 are disposed to be spaced apart from each other, or may be set in a different direction, when seen in a plan view.

A height HT2 of the optical waveguides WO12 is equal to the film thickness FT1 of the semiconductor layer SL and set to, for example, about 180 to 250 nm. Moreover, a width WD2 of the optical waveguides WO12 in the X-axis direction is set to, for example, about 100 to 500 nm. An impurity is introduced into the optical waveguide WO12, and the impurity concentration is, for example, in a range of $10^{15}$ to $10^{19}$ cm$^{-3}$, and the typical value is set to, for example, about $10^{15}$ cm$^{-3}$.

The insulating film IF1 is formed on the front surface of each of the two optical waveguides WO12. The insulating film IF1 is formed on the upper surface TS1 of the insulating layer CL corresponding to its portion exposed from the optical waveguide WO12 and on the two side surfaces SS2 and the upper surface TS4 of each of the optical waveguides WO12. That is, the insulating film IF1 is formed along the upper surface TS1 of the insulating layer CL and the front surface of each of the two optical waveguides WO12.

The optical waveguide WO12 is made of silicon, and the insulating layers CL and the insulating films IF1 and IF3 are made of silicon oxide. Moreover, the optical waveguides WO12 are surrounded by the insulating layer CL and the insulating films IF1 and IF3. For this reason, the optical waveguides WO12 function as core layers, and the insulating layer CL and the insulating films IF1 and IF3 function as cladding layers.

In the example shown in FIG. 19, the distance DS1 between the two optical waveguides WO11 in the X-axis direction is narrower than a distance DS2 between the two optical waveguides WO12 in the X-axis direction. That is, an area ratio of the optical waveguides WO11 in the region AR11 is greater than an area ratio of the optical waveguides WO12 in the region AR12. In this case, the area ratio of the optical waveguides WO11 means a ratio of the total sum of the areas corresponding to the portions of the region AR11 where the optical waveguides WO11 are formed relative to the entire area of the region AR11. Moreover, the area ratio of the optical waveguides WO12 means a ratio of the total sum of the area corresponding to the portions of the region AR12 where the optical waveguides WO12 are formed relative to the entire area of the region AR12.

A peripheral edge portion BS21 of the lower surface BS2 of each of the two optical waveguides WO12 and the insulating layer CL corresponding to the portion located under the peripheral edge portion BS21 are separated from each other in the thickness direction (Z-axis direction) of the insulating layer CL. In other words, the peripheral edge portion BS21 of the lower surface BS2 of each of the two optical waveguides WO12 is separated from the insulating layer CL.

Note that, in the example shown in FIG. 19, a recessed portion CC3 is formed on the upper surface TS1 of the insulating layer CL, and when seen in a plan view, the recessed portion CC3 is overlapped with the peripheral edge portion BS21 of the lower surface BS2 of the optical waveguide WO12. However, supposing that a portion closer to the center than the peripheral edge portion BS21 of the lower surface BS2 of the optical waveguide WO12 is a center portion BS22, the height position of the upper surface TS1 of the insulating layer CL corresponding the portion exposed from the optical waveguide WO12 may be lower than the height position of the upper surface TS5 of the insulating layer CL corresponding to a portion located under the center portion BS22 of the lower surface BS2 of the optical waveguide WO12.

The insulating film IF1 is buried between the peripheral edge portion BS21 of the lower surface BS2 of each of the two optical waveguides WO12 and the insulating layer CL.

The insulating film IF2 is formed on the insulating film IF1 in the region AR11, and the insulating film IF3 is formed on the insulating film IF2 in the region AR11 and is also formed on the insulating film IF1 in the region AR12. The insulating film IF3 is buried between the two optical waveguides WO12.

A recessed portion CC4 is formed between the two optical waveguides WO12. The bottom surface of the recessed portion CC4 corresponds to the upper surface TS1 of the insulating layer CL corresponding to a portion located between the two optical waveguides WO12, and the inner walls of the recessed portion CC4 correspond to side surfaces SS2 of the two optical waveguides WO12 that are opposed to each other.

Note that, in the third embodiment, in the region AR12, two or more of the optical waveguides WO12 may be formed, and in this case, the distance DS2 between the two optical waveguides WO12 means a distance between the adjacent two optical waveguides WO12. Moreover, the third embodiment is not intended to be limited by the configuration in which at least two of the optical waveguides WO12 are formed. Accordingly, only the single optical waveguide WO12 may be formed in the region AR12. In this case, in place of the distance between the two optical waveguides WO12, the distance DS2 means a distance between one of the optical waveguides WO12 and the optical waveguide WO11 disposed at the position closest to the optical waveguide WO12 among the optical waveguides WO11 formed in the region AR11.

<Method for Manufacturing Semiconductor Device>

Figure 20:
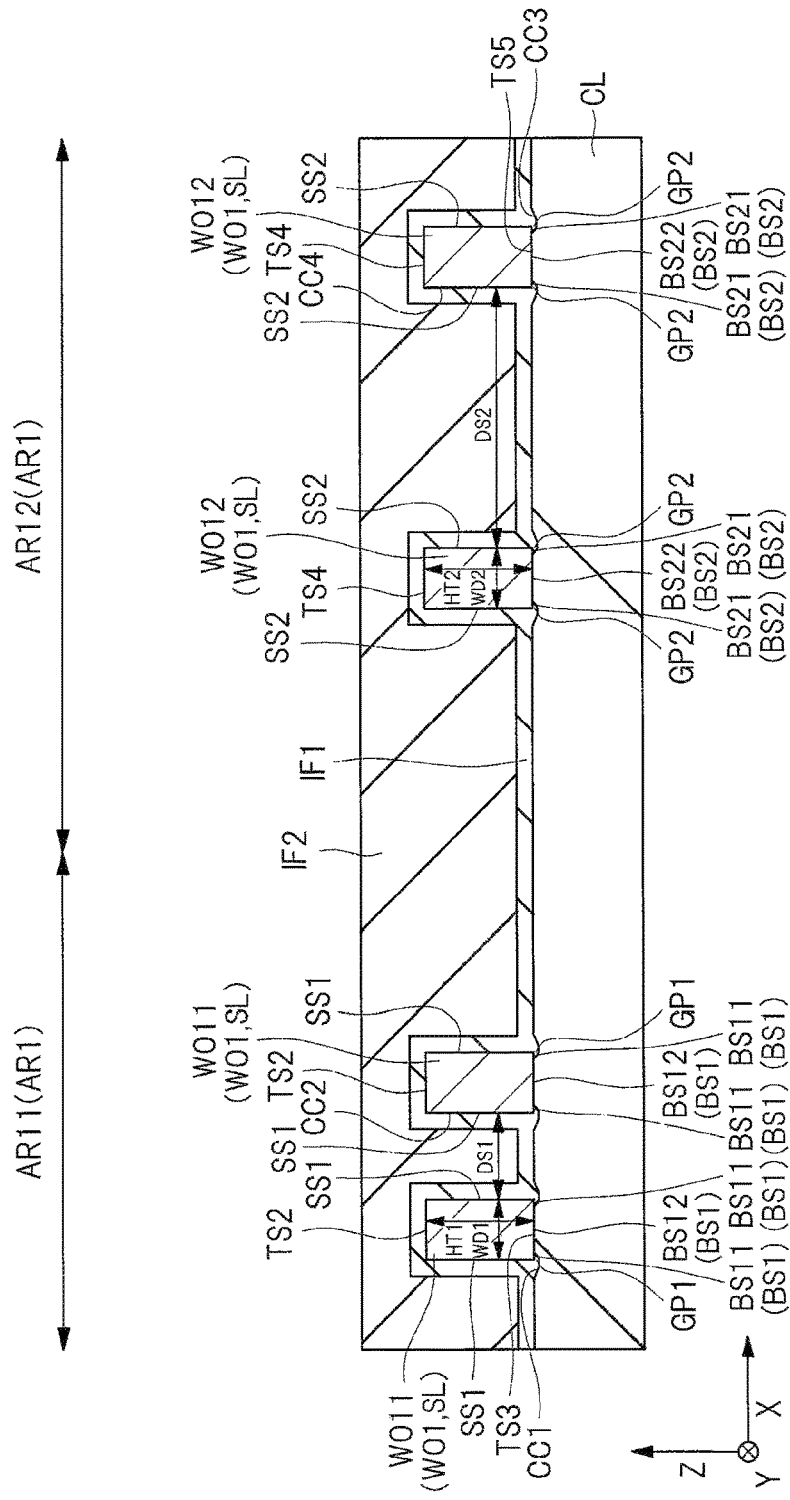
FIG. 20 is a cross-sectional view showing a main part during a manufacturing process of the semiconductor device of the third embodiment.
Figure 21:
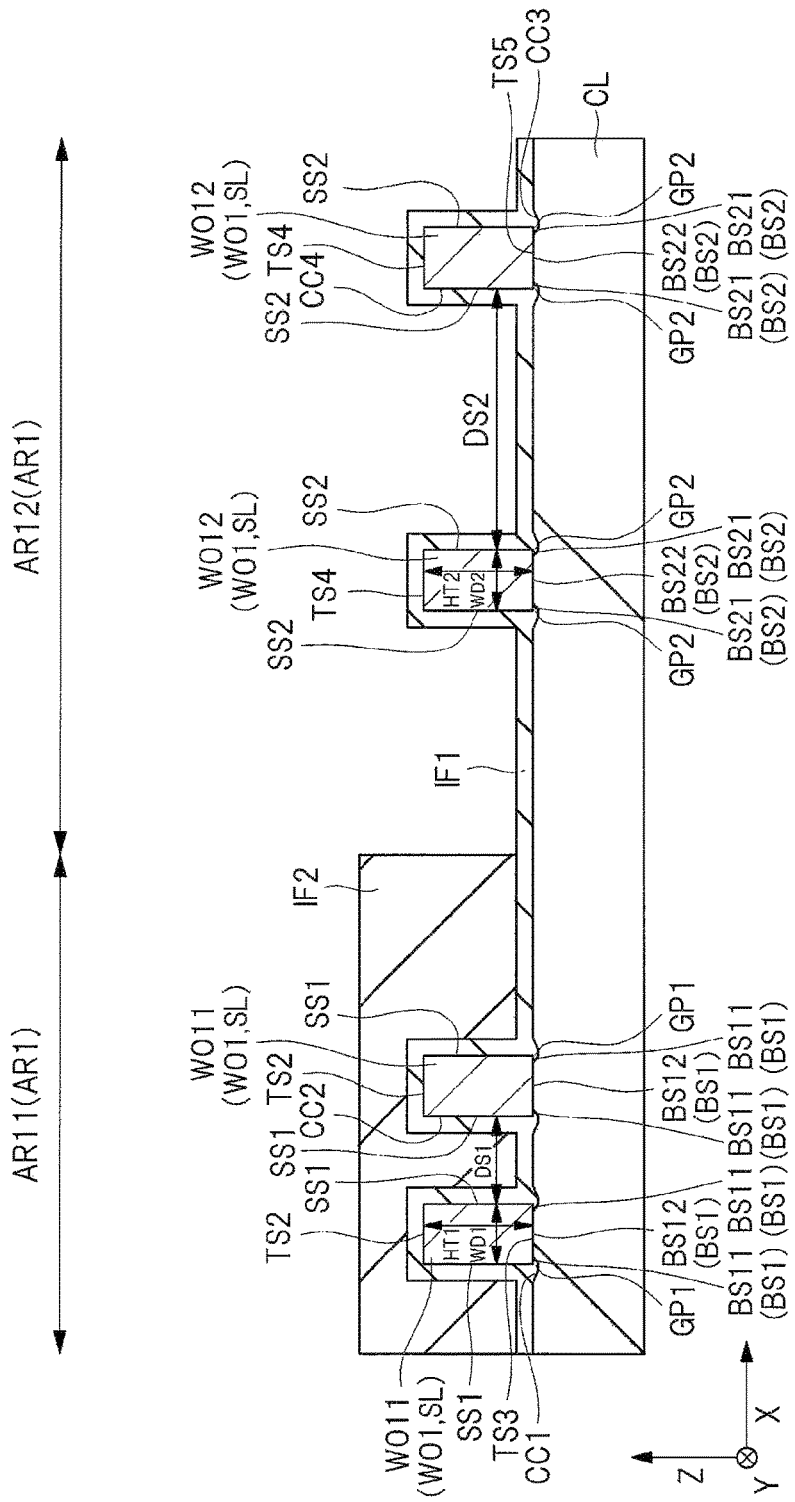
FIG. 21 is a cross-sectional view showing a main part during the manufacturing process of the semiconductor device of the third embodiment.

FIG. 20 is a cross-sectional view showing a main part during a manufacturing process of the semiconductor device of the third embodiment, and FIG. 21 is a cross-sectional view showing a main part during the manufacturing process of the semiconductor device of the third embodiment. FIG. 20 and FIG. 21 show the structure on the periphery of the optical waveguide in an enlarged manner.

In the method for manufacturing the semiconductor device of the third embodiment, in a process corresponding to step S1 of FIG. 3, as shown in FIG. 20, a semiconductor substrate SB (see FIG. 5) having the insulating layer CL formed on the base substrate SB1 (see FIG. 5) in the regions AR11 and AR12 is prepared. Then, in a process corresponding to step S2 of FIG. 3, as shown in FIG. 20, two optical waveguides WO11 are formed in the region AR11, and in the region AR12, when seen in a plan view, two optical waveguides WO12 which are disposed to be spaced apart from each other in the X-axis direction and respectively composed of the semiconductor layer SL are formed. The distance DS1 between the two optical waveguides WO11 in the X-axis direction is narrower than the distance DS2 between the two optical waveguides WO12 in the X-axis direction.

Moreover, upon carrying out a process corresponding to step S2 of FIG. 3, a gap GP2 is formed between the peripheral edge portion BS21 of the lower surface BS2 of each of the two optical waveguides WO12 and the insulating layer CL.

Thereafter, in a process corresponding to step S41 of FIG. 4, as shown in FIG. 20, an insulating film IF1 is formed along the front surface of each of the two optical waveguides WO12, so that the gap GP2 is buried by the insulating film IF1. Moreover, in a process corresponding to step S42 of FIG. 4, as shown in FIG. 20, an insulating film IF2 is formed on the insulating film IF1 in the region AR11 and region AR12.

In this manner, in the third embodiment, after a process corresponding to step S42 of FIG. 4, a process for removing the insulating film IF2 is carried out in the region AR12, as shown in FIG. 21, prior to carrying out a process corresponding to step S43 of FIG. 4. Then, in a process corresponding to step S43 of FIG. 4, as shown in FIG. 19, an insulating film IF3 is formed on the insulating film IF2 in the region AR11, and the insulating film IF3 is formed on the insulating film IF1 in the region AR12.

<Main Characteristic and Effect of Present Embodiment>

The semiconductor device in accordance with the third embodiment has the same characteristics as those of the semiconductor device of the first embodiment and also has the same effects as those possessed by the semiconductor device of the first embodiment.

Meanwhile, in the third embodiment, in the region AR12 where the distance DS2 between the two optical waveguides WO12 is wide, no insulating film IF2 is formed on the insulating film IF1, and the insulating film. IF3 is formed on the insulating film. IF1 without the insulating film IF2 being interposed therebetween.

In the region AR12, since the distance DS2 between the two optical waveguides WO12 is wide, it is not necessary to take it into consideration whether or not a space is formed between the two optical waveguides WO12, and it is not necessary to form the insulating film IF2 made of silicon oxide by the CVD through use of a raw material gas containing, for example, a TEOS gas and an ozone gas. Accordingly, in the region AR12, the insulating film IF3 can be formed on the insulating film IF1 without the insulating film IF2 being interposed therebetween.

The insulating film IF3 is formed by the PECVD, for example, and made of silicon oxide. For this reason, deviations in density are small in the respective portions of the insulating film IF3, and deviations in refractive index in the respective portions of the insulating film. IF3 are small. Accordingly, in the region AR12, optical characteristics of the optical waveguides WO12 can be improved when the optical waveguides WO12 are formed as the core layers and the insulating layer CL and the insulating films IF1 and IF3 are formed as cladding layers.

That is, in the third embodiment, by forming the insulating film IF2 on the insulating film IF1 in the region AR11 where the distance DS1 between the two optical waveguides WO11 is narrow, it is possible to prevent or suppress the formation of a space between the two optical waveguides WO11, so that the optical characteristics of the optical waveguides WO11 can be improved. In contrast, in the region AR12 where the distance DS2 between the two optical waveguides WO12 is wide, by forming the insulating film IF3 on the insulating film IF1 without the insulating film IF2 being interposed therebetween, it is possible to improve the optical characteristics of the optical waveguides WO12. In other words, in the third embodiment, in the respective two regions where the area ratios of the optical waveguides are mutually different, it is possible to optimize the structures of the cladding layers.

(Fourth Embodiment)

In the semiconductor device in accordance with the third embodiment, the insulating film IF2 is formed in the regions AR11 and AR12, and by removing the insulating film IF2 from the region AR12, the insulating film IF3 is formed on the insulating film IF1 in the region AR12. However, an insulating film that is similar to the insulating film IF3 is formed in the region AR11, and by removing the insulating film similar to the insulating film IF3 from the region AR11, the insulating film similar to the insulating film IF3 may be formed on the insulating film IF1 in the region AR12. Descriptions will be given of such an example as a semiconductor device of a fourth embodiment. Note that, in the following, different points from the semiconductor devices of the first and third embodiments will be mainly described.

<Structure on Periphery of Optical Waveguide>

Figure 22:
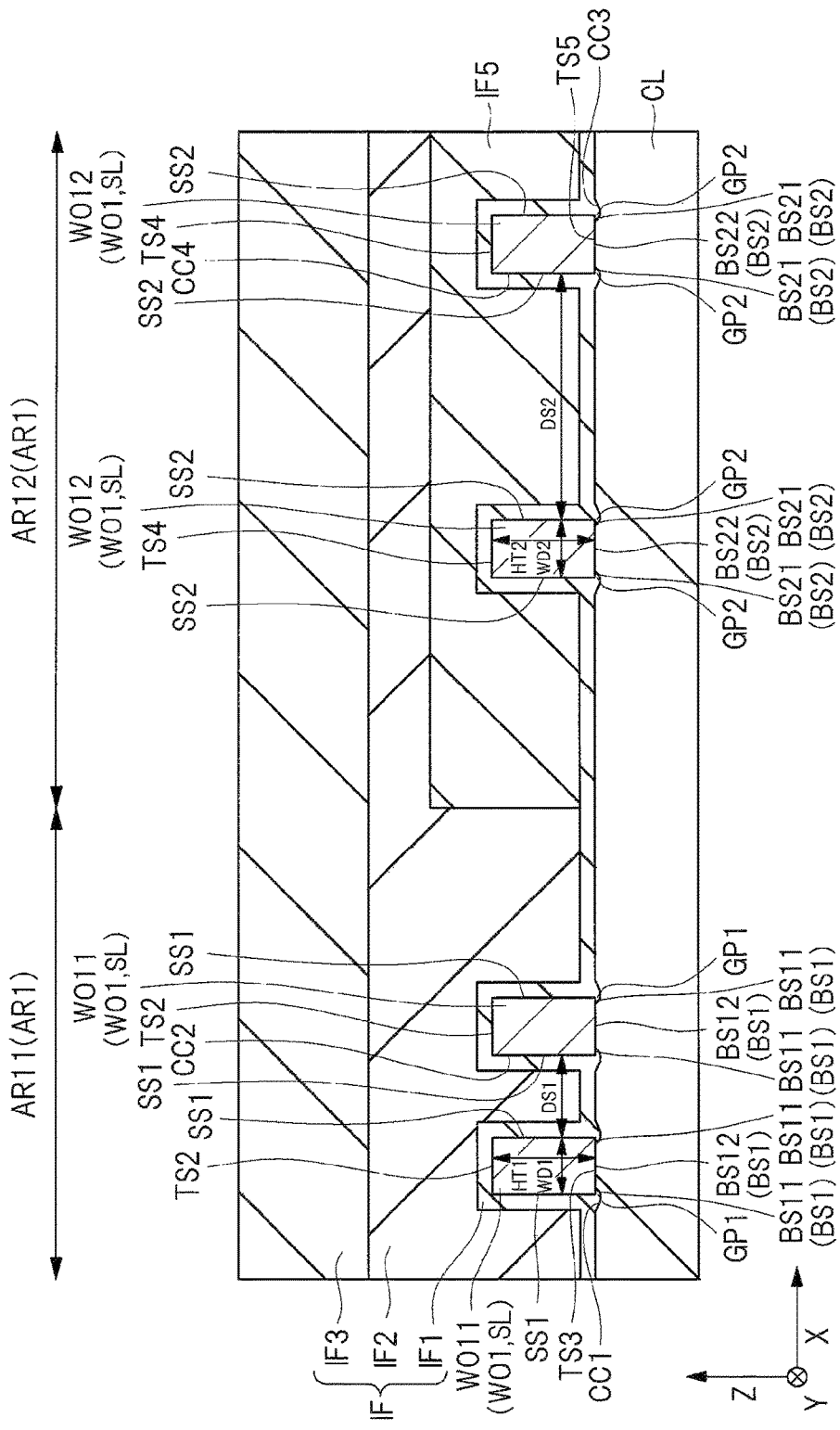
FIG. 22 is a cross-sectional view showing a main part of a semiconductor device in accordance with a fourth embodiment.

FIG. 22 is a cross-sectional view showing a main part of the semiconductor device in accordance with the fourth embodiment. FIG. 22 shows a structure on the periphery of the optical waveguide in an enlarge manner.

As shown in FIG. 22, a region AR1 includes a region AR11 on a main surface SB1a side (see FIG. 1) of a base substrate SB1 (see FIG. 1) and a region AR12 on the main surface SB1a side (see FIG. 1) of the base substrate SB1 (see FIG. 1). The insulating layer CL is formed on the base substrate SB1 in the region AR11 and the region AR12. Moreover, in the same manner as in the semiconductor device of the third embodiment, the semiconductor device of the fourth embodiment is provided with two optical waveguides WO11 and two optical waveguides WO12.

The two optical waveguides WO11 are formed on the insulating layer CL in the region AR11. The two optical waveguides WO11 are composed of the semiconductor layer SL formed on the insulating layer CL in the region AR11 in the same manner as in the third embodiment. The two optical waveguides WO11 are disposed to be spaced apart from each other in the X-axis direction, when seen in a plan view.

The two optical waveguides WO12 are formed on the insulating layer CL in the region AR12. The two optical waveguides WO12 are composed of the semiconductor layer SL formed on the insulating layer CL in the region AR12. The two optical waveguides WO12 are disposed to be spaced apart from each other in the X-axis direction, when seen in a plan view.

Note that the direction in which the optical waveguides WO12 are disposed to be spaced apart from each other may be set in the same direction as the direction in which the optical waveguides WO11 are disposed to be spaced apart from each other when seen in a plan view or may be set in a different direction.

Also in the example shown in FIG. 22, in the same manner as in the example shown in FIG. 19, the distance DS1 between the two optical waveguides WO11 in the X-axis direction is narrower than the distance DS2 between the two optical waveguides WO12 in the X-axis direction.

Also in the region AR12, in the same manner as in the region AR11, a peripheral edge portion BS21 of the lower surface BS2 of each of the two optical waveguides WO12 is separated from the insulating layer CL, and the insulating film IF1 is buried between the peripheral edge portion BS21 of the lower surface BS2 of each of the two optical waveguides WO12 and the insulating layer CL. Note that the insulating film IF1 is formed along the upper surface TS1 of the insulating layer CL and the front surface of each of the two optical waveguides WO12.

Different from the third embodiment, in the fourth embodiment, an insulating film IF5 made of silicon oxide is formed on the insulating film IF1 in the region AR12. For this reason, the insulating film IF2 is formed on the insulating film IF1 in the region AR11 and is also formed on the insulating film IF5 in the region AR12. Moreover, the insulating film IF3 is formed on the insulating film IF2 in the regions AR11 and AR12.

The insulating film IF5 made of silicon oxide is formed by, for example, the PECVD in the same manner as in the insulating film IF3.

Note that, also in the fourth embodiment, in the region AR12, two or more of the optical waveguides WO12 may be formed in the same manner as in the third embodiment, or only the single optical waveguide WO12 may be formed.

<Method for Manufacturing Semiconductor Device>

Figure 23:
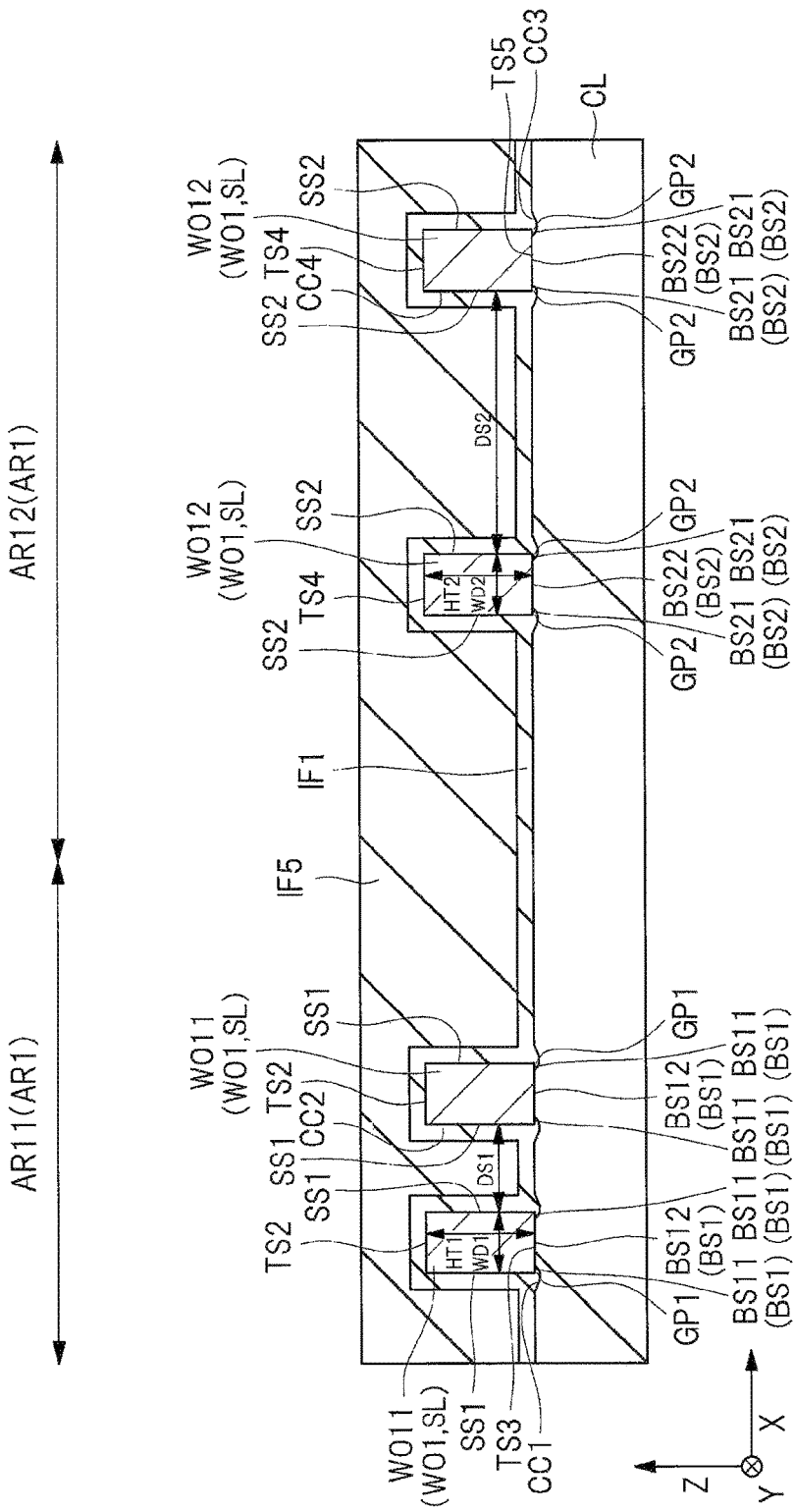
FIG. 23 is a cross-sectional view showing a main part during a manufacturing process of the semiconductor device of the fourth embodiment.
Figure 24:
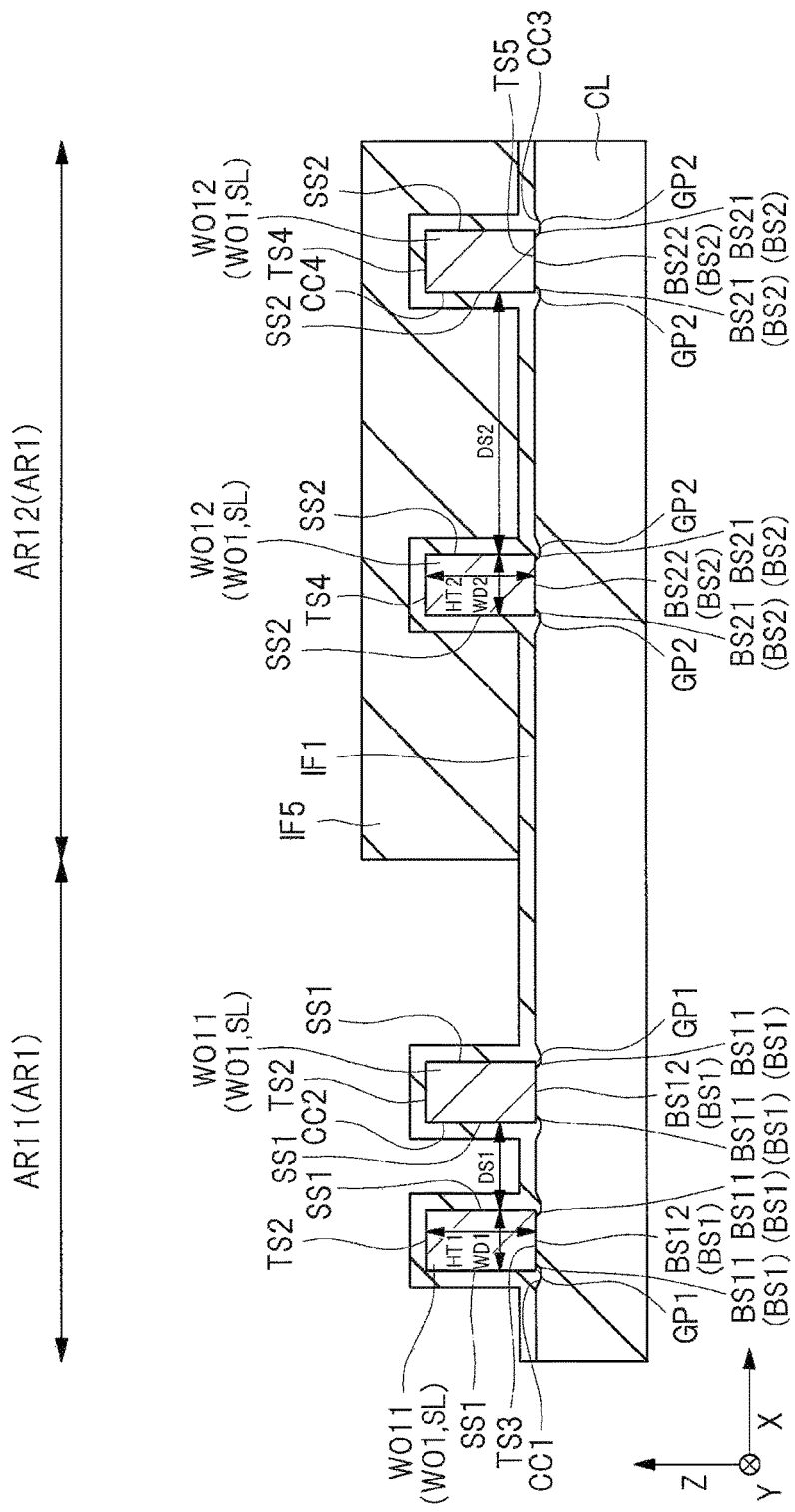
FIG. 24 is a cross-sectional view showing a main part during the manufacturing process of the semiconductor device of the fourth embodiment.
Figure 25:
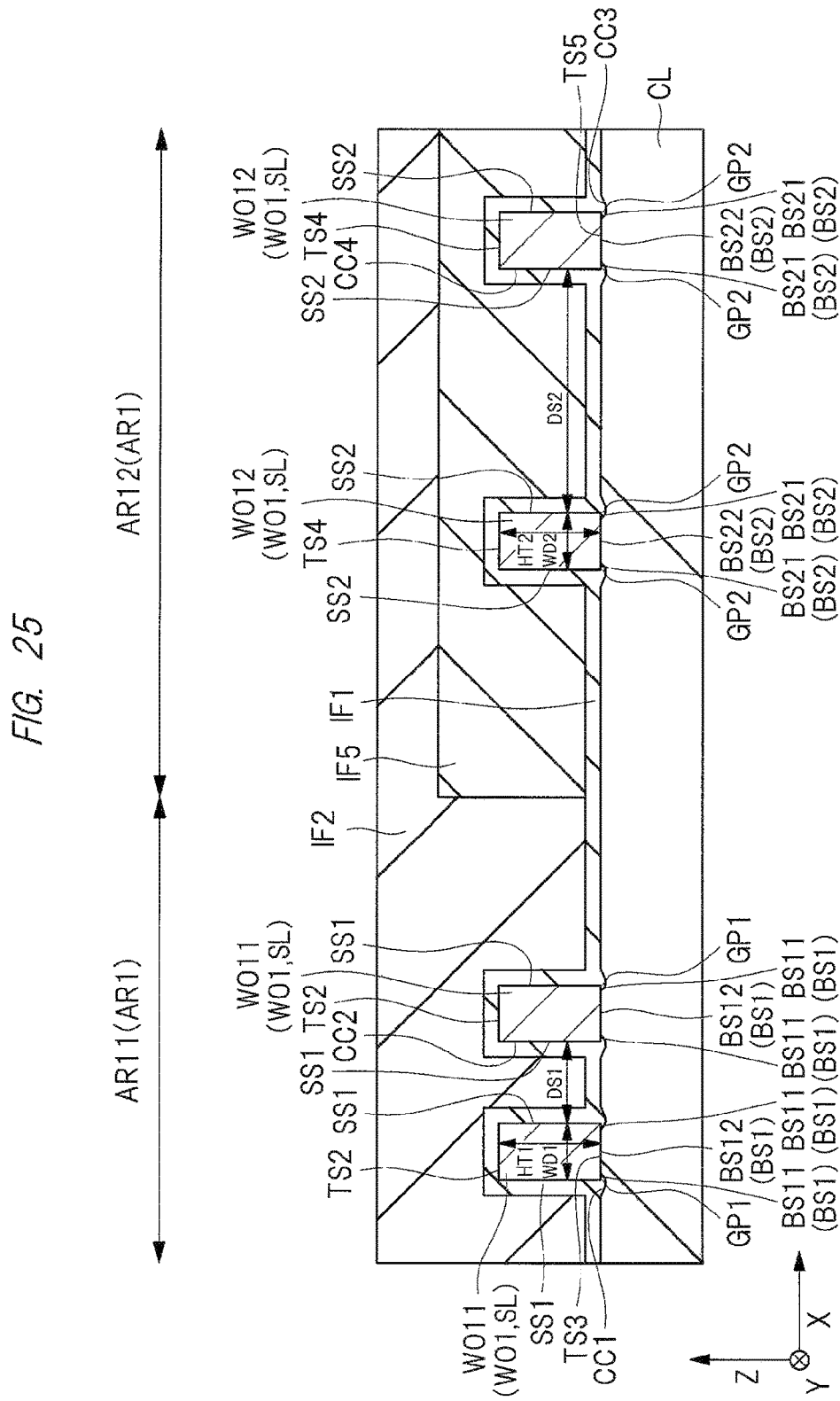
FIG. 25 is a cross-sectional view showing a main part during the manufacturing process of the semiconductor device of the fourth embodiment.

FIGS. 23 to 25 are cross-sectional views showing main parts during a manufacturing process of the semiconductor device of the fourth embodiment. FIG. 23 to FIG. 25 show a structure on the periphery of the optical waveguide in an enlarge manner.

Also in the method for manufacturing the semiconductor device of the fourth embodiment, in the same manner as in the method for manufacturing the semiconductor device of the third embodiment, in a process corresponding to step S1 of FIG. 3, as shown in FIG. 23, a semiconductor substrate SB (see FIG. 5) having the insulating layer CL formed on the base substrate SB1 (see FIG. 5) in the regions AR11 and AR12 is prepared. Then, in a process corresponding to step S2 of FIG. 3, as shown in FIG. 23, two optical waveguides WO11 are formed in the region AR11, and in the region AR12, when seen in a plan view, two optical waveguides WO12 which are disposed to be spaced apart from each other in the X-axis direction, and respectively composed of the semiconductor layer SL are formed. The distance DS1 between the two optical waveguides WO11 in the X-axis direction is narrower than the distance DS2 between the two optical waveguides WO12 in the X-axis direction.

Moreover, upon carrying out a process corresponding to step S2 of FIG. 3, a gap GP2 is formed between the peripheral edge portion BS21 of the lower surface BS2 of each of the two optical waveguides WO12 and the insulating layer CL.

Thereafter, in a process corresponding to step S41 of FIG. 4, as shown in FIG. 23, an insulating film IF1 is formed along the front surface of each of the two optical waveguides WO12, so that the gap GP2 is buried by the insulating film IF1.

In this manner, in the fourth embodiment, after a process corresponding to step S41 of FIG. 4 has been carried out, an insulating film IF5 is formed on the insulating film IF1 in the regions AR11 and AR12. In this process for forming the insulating film IF5, the insulating film IF5 made of silicon oxide is formed on the insulating film IF1 by the PECVD. More preferably, the insulating film IF5 made of silicon oxide is formed by the PECVD through use of a raw material gas containing a tetraethoxy silane (TEOS) gas and an oxygen gas ($O_2$) or a raw material gas containing a silane ($SiH_4$) gas and a nitrous oxide ($N_2O$) gas. Through the PECVD, a silicon oxide film can be formed at a high film-forming speed even at a low temperature. Note that, as the insulating film IF5, the insulating film IF5 made of, for example, BPSG in place of silicon oxide, may be formed, in the same manner as the insulating film IF3.

Moreover, after the formation of the insulating film IF5, a process for removing the insulating film IF5 is carried out in the region AR11 as shown in FIG. 24, prior to carrying out a process corresponding to step S42 of FIG. 4.

Next, in the process corresponding to step S42 of FIG. 4, an insulating film IF2 is formed on the insulating film IF1 in the region AR11, as shown in FIG. 25, and the insulating film IF2 is formed on the insulating film IF5 in the region AR12. Then, in a process corresponding to step S43 of FIG. 4, as shown in FIG. 22, an insulating film IF3 is formed on the insulating film IF2 in the regions AR11 and AR12.

<Main Characteristic and Effect of Present Embodiment>

The semiconductor device in accordance with the fourth embodiment has the same characteristics as those of the semiconductor device of the third embodiment and also has the same effects as those possessed by the semiconductor device of the third embodiment.

In this case, in the third embodiment, in the region AR12, the insulating film IF2 is formed on the insulating film IF1, and after the insulating film IF1 has been exposed by removing the insulating film IF2, the insulating film IF3 needs to be again formed. That is, in the third embodiment, in the region AR12, the insulating film on the insulating film IF1 needs to be redeposited.

In contrast, in the fourth embodiment, the insulating film IF5 similar to the insulating film IF3 is formed in the region AR11, and by removing the insulating film IF5 from the region AR11, the insulating film IF5 is formed on the insulating film IF1 in the region AR12. Accordingly, in the fourth embodiment, since it is not necessary to redeposit the insulating film onto the insulating film IF1 in the region AR12, it is possible to prevent or suppress damage to the insulating film IF1, the optical waveguides WO12, and the insulating layer CL by the redeposition process of the insulating film. Hence, in the region AR12 where the distance DS2 between the two optical waveguides WO12 is wide, it is possible to improve the optical characteristics of the optical waveguides WO12.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A semiconductor device comprising:
   a base substrate;
   an insulating layer formed on the base substrate;
   a first optical waveguide composed of a semiconductor layer formed on the insulating layer; and
   a first insulating film formed along an upper surface of the insulating layer and an upper surface and side surfaces of the first optical waveguide,
   wherein a first peripheral edge portion of a first lower surface of the first optical waveguide is separated from the insulating layer,
   wherein a portion of the first lower surface that is inside the first peripheral edge portion contacts with the insulating layer,
   the insulating layer has a trench under the first peripheral edge portion, and
   the first insulating film is buried in the trench.

2. The semiconductor device according to claim 1, further comprising:
   two of the first optical waveguides disposed to be spaced apart from each other in a first direction when seen in a plan view; and
   a second insulating film formed on the first insulating film,
   wherein the second insulating film is buried between the two first optical waveguides, with the first insulating film interposed therebetween.

3. The semiconductor device according to claim 2, further comprising:
   a third insulating film formed on the second insulating film,
   wherein the second insulating film has a flat upper surface.

4. The semiconductor device according to claim 2,
   wherein the insulating layer is formed on the base substrate in a first region on a main surface side of the base substrate and in a second region on the main surface side of the base substrate, and
   the two first optical waveguides are formed on the insulating layer in the first region,
   the semiconductor device further comprising:
   two second optical waveguides composed of the semiconductor layer formed on the insulating layer in the second region; and
   a fourth insulating film formed on the second insulating film in the first region,
   wherein the two second optical waveguides are disposed to be spaced apart from each other in a second direction when seen in a plan view,
   a first distance between the two first optical waveguides in the first direction is narrower than a second distance between the two second optical waveguides in the second direction,
   the first insulating film is formed along a front surface of each of the two second optical waveguides,
   a second peripheral edge portion on a second lower surface of each of the two second optical waveguides is separated from the insulating layer,
   the first insulating film is buried between the second peripheral edge portion and the insulating layer,
   the second insulating film is formed on the first insulating film in the first region, and
   the fourth insulating film is formed on the first insulating film in the second region.

5. The semiconductor device according to claim 2,
   wherein the insulating layer is formed on the base substrate in a third region on a main surface side of the base substrate and in a fourth region on the main surface side of the base substrate, and
   the two first optical waveguides are formed on the insulating layer in the third region,
   the semiconductor device further comprising:
   two third optical waveguides composed of the semiconductor layer formed on the insulating layer in the fourth region;
   a fifth insulating film formed on the second insulating film in the third region; and
   a sixth insulating film formed on the first insulating film in the fourth region,
   wherein the two third optical waveguides are disposed to be spaced apart from each other in a third direction when seen in a plan view,
   a third distance between the two first optical waveguides in the first direction is narrower than a fourth distance between the two third optical waveguides in the third direction,
   the first insulating film is formed along a front surface of each of the two third optical waveguides,
   a third peripheral edge portion on a third lower surface of each of the two third optical waveguides is separated from the insulating layer,
   the first insulating film is buried between the third peripheral edge portion and the insulating layer,
   the second insulating film is formed on the first insulating film in the third region and on the sixth insulating film in the fourth region, and
   the fifth insulating film is formed on the second insulating film in the fourth region.

6. A method for manufacturing a semiconductor device comprising the steps of:
   (a) preparing a semiconductor substrate having a base substrate, an insulating layer formed on the base substrate, and a semiconductor layer formed on the insulating layer;
   (b) patterning the semiconductor layer to form a first optical waveguide composed of the semiconductor layer; and
   (c) forming a first insulating film along an upper surface of the insulating layer and a front surface of the first optical waveguide,
   wherein upon carrying out the step (b), a first gap is formed between a first peripheral edge portion of a first lower surface of the first optical waveguide and the insulating layer, and
   in step (c), the first gap is buried by the first insulating film.

7. The method for manufacturing a semiconductor device according to claim 6,
   wherein the step (b) further comprises the steps of:
   (b1) patterning the semiconductor layer to form the first optical waveguide; and (b2) cleaning a front surface of the insulating film after the step (b1), and upon carrying out the step (b2) the first gap is formed.

8. The method manufacturing a semiconductor device according to claim 7,
wherein the insulating layer contains oxygen and silicon, and
in the step (b2), the front surface of the insulating layer is cleaned by using a cleaning liquid containing hydrofluoric acid.

9. The method for manufacturing a semiconductor device according to claim 6,
wherein in the step (c), the first insulating film made of silicon oxide is formed by chemical vapor deposition through use of a tetraethoxy silane gas, a first gas containing a tetraethoxy silane gas and an oxygen gas, a second gas containing a silane gas and a nitrous oxide gas, or a third gas containing dichlorosilane and a nitrous oxide gas.

10. The method for manufacturing a semiconductor device according to claim 9, further comprising the step of:
(d) forming a second insulating film made of silicon oxide on the first insulating film by chemical vapor deposition through use of a fourth gas containing a tetraethoxy silane gas and an ozone gas,
wherein in the step (b), two of the first optical waveguides are formed to be disposed to be spaced apart from each other in a first direction, when seen in a plan view, and
in the step (d), the second insulating film is buried between the two first optical waveguides with the first insulating film interposed therebetween.

11. The method for manufacturing a semiconductor device according to claim 10, further comprising the step of:
(e) forming a third insulating film made of silicon oxide on the second insulating film by plasma chemical vapor deposition.

12. The method for manufacturing a semiconductor device according to claim 11, further comprising the step of:
(f) planarizing an upper surface of the second insulating film after the step (d), prior to the step (e).

13. The method for manufacturing a semiconductor device according to claim 11,
wherein in the step (a), the semiconductor substrate having the insulating layer formed on the base substrate in a first region on a main surface side of the base substrate and in a second region on the main surface side of the base substrate is prepared,
in the step (b), two of the first optical waveguides are formed in the first region and two of second optical waveguides made of the semiconductor layer are formed in the second region,
the two second optical waveguides are disposed to be spaced apart from each other in a second direction when seen in a plan view,
a first distance between the two first optical waveguides in the first direction is narrower than a second distance between the two optical waveguides in the second direction,
upon carrying out the step (b), a second gap is formed between a second peripheral edge portion of a second lower surface of each of the two second optical waveguides and the insulating layer,
in the step (c), the first insulating film is formed along a front surface of each of the two second optical waveguides, and the second gap is buried by the first insulating film, and in the step (d), the second insulating film is formed on the first insulating film in the first region and the second region,
the method further comprising the step of:
(g) removing the second insulating film from the second region after the step (d), prior to the step (e),
wherein in the step (e), the third insulating film is formed on the second insulating film in the first region and the third insulating film is formed on the first insulating film in the second region.

14. The method for manufacturing a semiconductor device according to claim 11,
wherein in the step (a), the semiconductor substrate having the insulating layer formed on the base substrate in a third region on a main surface side of the base substrate and in a fourth region on the main surface side of the base substrate is prepared,
in the step (b), two of the first optical waveguides are formed in the third region and two of third optical waveguides made of the semiconductor layer are formed in the fourth region,
the two third optical waveguides are disposed to be spaced apart from each other in a third direction when seen in a plan view,
a third distance between the two first optical waveguides in the first direction is narrower than a fourth distance between the two third optical waveguides in the third direction,
upon carrying out the step (b), a third gap is formed between a third peripheral edge portion of a third lower surface of each of the two third optical waveguides and the insulating layer, and
in the step (c), the first insulating film is formed along a front surface of each of the two third optical waveguides, and the third gap is buried by the first insulating film,
the method further comprising the steps of:
(h) forming a fourth insulating film made of silicon oxide on the first insulating film in the third region and the fourth region, by plasma chemical vapor deposition after the step (c); and
(i) removing the fourth insulating film from the third region after the step (h), prior to the step (d),
wherein in the step (d), the second insulating film is formed on the first insulating film in the third region and the second insulating film is formed on the fourth insulating film in the fourth region, and
in the step (e), the third insulating film is formed on the second insulating film in the third region and the fourth region,
the third metal is Ti, and
the fourth metal is W,
wherein, in the step (b), the rolled body is mounted on the semiconductor chip such that graphene constituting the graphite sheet is disposed in a direction crossing a surface of the semiconductor chip.

15. The semiconductor device according to claim 1, wherein a thickness of the insulating layer is in a range from 2 µm to 3 µm,
wherein a thickness of the semiconductor layer is in a range from 180 nm to 250 nm, and
wherein a thickness of the first insulating film is less than the thickness of the semiconductor layer and in a range from 50 nm to 200 nm.

16. The semiconductor device according to claim 1, wherein the first insulating film is conformally formed on a side surface and the upper surface of the first optical waveguide with a uniform film thickness.

17. The semiconductor device according to claim 1, wherein a second peripheral edge portion of the first lower surface of the first optical waveguide is separated from the insulating layer, and the first insulating film is buried between the second peripheral edge portion and the insulating layer, and
   wherein the portion of the first lower surface that contacts with the insulating layer comprises a central portion of the first lower surface, the central portion being formed between the first and second peripheral edge portions.

18. The semiconductor device according to claim 1, wherein the trench comprises a recessed portion formed in an upper surface of the insulating layer, the recessed portion being formed at a location where the first peripheral edge portion is separated from the insulating layer and having a depth which is less than a thickness of the first insulating film.

19. The semiconductor device according to claim 2, wherein a ratio of a distance between the first optical waveguides relative to a height of the first optical waveguides is 1.5 or less.

20. A semiconductor device comprising:
   an insulating layer formed on a substrate;
   an optical waveguide formed on the insulating layer and including a bottom surface that contacts with the insulating layer, a side of the optical waveguide being formed over a recess in an upper surface of the insulating layer such that a gap is formed between a bottom surface of the optical waveguide and the insulating layer; and
   a first insulating film formed along the upper surface of the insulating layer and on the optical waveguide, and being formed in the recess in the upper surface of the insulating layer so as to fill the gap between the bottom surface of the optical waveguide and the insulating layer.

* * * * *